United States Patent [19]

Tsutsumi et al.

[11] Patent Number: 5,516,837
[45] Date of Patent: May 14, 1996

[54] POLYIMIDE BASED RESIN COMPOSITION

[75] Inventors: Toshihiko Tsutsumi; Toshiyuki Nakakura; Toshiaki Takahashi; Atsushi Morita; Yoshihisa Gotoh; Hiroyasu Oochi, all of Kanagawa, Japan

[73] Assignee: Mitsui Toatsu Chemicals, Inc., Tokyo, Japan

[21] Appl. No.: 204,433

[22] Filed: Mar. 2, 1994

Related U.S. Application Data

[60] Division of Ser. No. 883,267, May 14, 1992, Pat. No. 5,312,866, which is a continuation-in-part of Ser. No. 617,147, Nov. 23, 1990, abandoned.

[30] Foreign Application Priority Data

| Nov. 30, 1989 | [JP] | Japan | 1-309100 |
| Dec. 5, 1989 | [JP] | Japan | 1-314394 |
| Jul. 30, 1990 | [JP] | Japan | 2-199058 |
| May 21, 1991 | [JP] | Japan | 3-116153 |
| May 28, 1991 | [JP] | Japan | 3-123350 |
| May 29, 1991 | [JP] | Japan | 3-125726 |
| May 29, 1991 | [JP] | Japan | 3-125789 |
| May 30, 1991 | [JP] | Japan | 3-127081 |

[51] Int. Cl.$^6$ .......................... C08L 67/02; C08L 79/08; C08L 27/12
[52] U.S. Cl. .......................... 524/600; 524/601; 525/178; 525/425; 525/534; 525/928
[58] Field of Search .......................... 525/425, 534, 525/928, 178; 524/600, 601

[56] References Cited

U.S. PATENT DOCUMENTS

| 4,728,698 | 3/1988 | Isayev et al. | 525/439 |
| 4,816,516 | 3/1989 | Yamaya et al. | 525/184 |
| 4,835,047 | 5/1989 | Isayev et al. | 525/425 |
| 4,871,817 | 10/1989 | Rock | 525/425 |
| 5,135,990 | 8/1992 | Bookbinder et al. | 525/425 |

Primary Examiner—Thomas Hamilton, III
Attorney, Agent, or Firm—Burns, Doane, Swecker & Mathis

[57] ABSTRACT

A molding resin composition comprising 99.9 to 50% by weight of polyimide represented by the formula:

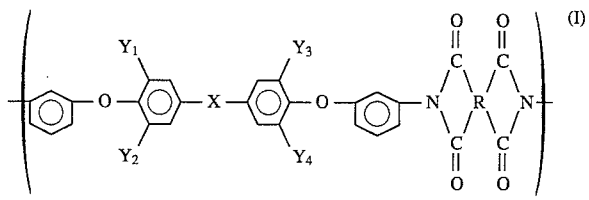

and 0.1 to 50% by weight of polyether ketone resin and/or polyester resin, and more particularly comprising the polyester resin capable of forming an anisotropical molten phase at a temperature of 420° C. or less, and a polyimide-based molding resin composition which comprises the said resins and other additives such as phenolic resin, fluororesin, graphite, carbon fibers, aromatic polyamide fibers, potassium titanate fibers and a crystallization accelerator, and is excellent in thermal resistance, chemical resistance, mechanical strength and processability.

3 Claims, No Drawings

POLYIMIDE BASED RESIN COMPOSITION

CROSS-REFERENCE TO RELATED APPLICATION

This application is a divisional of application Ser. No. 07/883,267, filed May 14, 1992 now U.S. Pat. No. 5,312,866, which is a continuation-in-part of application Ser. No. 07/617,147, filed on Nov. 23, 1990, now abandoned.

BACKGROUND OF THE INVENTION

1. Field of the Invention

The present invention relates to a molding resin composition which comprises polyimide resin as a principal component. More particularly, the invention relates to a polyimide-based molding resin composition which comprises polyimide resin and polyether ketone resin and/or polyester resin, and relates to a polyimide-based molding resin composition which comprises the said resins and other additives such as phenolic resin, fluororesin, graphite, carbon fiber, aromatic polyamide fiber, potassium titanate fiber and a crystallization accelerator, and is excellent in thermal resistance, chemical resistance, mechanical strength and processability.

2. Description of the Related Art

Conventionally, polyimide has outstanding thermal resistance, is excellent in mechanical strength and dimensional stability, and additionally has flame retardance and electrical insulation properties. Polyimide has hence been used in areas such as electrical and electronic parts, space and aeronautic members, and transportation equipment. In the future, it is expected that the use of polyimide will be extended to areas where thermal resistance is required. Various kinds of polyimide which exhibit excellent properties have been developed.

Although polyimide is excellent in thermal resistance, means such as sinter molding is generally required in the case of using polyimide as a molding material. Even though polyimide is thermoplastic and melt-moldable, processing under high temperature and high pressure is required in many cases. When polyimide is processed under such high temperature and pressure, polyimide is, though excellent in thermal resistance, thermally deteriorated or oxidized which decreases mechanical strength and which makes molding of thin-walled articles difficult.

Some kinds of polyimide have slow rates of crystallization in the processing stage and molded articles can be obtained in an amorphous state. Even though heat treatment is carried out in order to enhance the crystallinity of such polyimides, dimensional changes resulting from crystallization have led to severe restrictions on the application of such polyimides to areas such as precision parts.

On the other hand, when processability is improved, the polyimide has a lower glass transition temperature and is soluble in halogenated hydrocarbons. That is, the polyimide has decreased performance in view of thermal and solvent resistances. Consequently, conventionally proposed polyimides have both merits and drawbacks, and, it has been desired to accomplish further improvement.

The present inventors have also found a novel polyimide resin having recurring units represented by the formula (I):

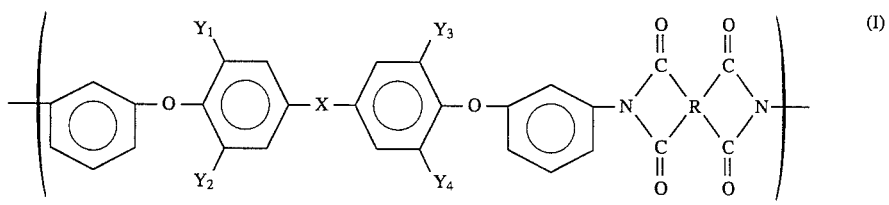

wherein X is a direct bond, divalent hydrocarbon having from 1 to 10 carbon atoms, hexafluorinated isopropylidene, carbonyl, thio or sulfonyl; $Y_1$, $Y_2$, $Y_3$ and $Y_4$ are individually hydrogen, lower alkyl, lower alkoxy, chlorine or bromine; R is a tetravalent radical selected from an aliphatic radical having 2 or more carbon atoms, alicyclic, monocyclic aromatic or fused polycyclic aromatic radical or a polycyclic aromatic radical connected to each other through a direct bond or a bridge member [Japanese Laid-Open Patent SHO 61-143478(1986), 62-68817(1987), 62-86021(1987), 62-235381(1987) and 63-128025(1988)].

The polyimide resin thus found is a novel thermal-resistant resin having various favorable properties such as excellent mechanical strength, thermal property, electrical property and solvent resistance in addition to its essential thermal resistance.

The polyimide resin is excellent in thermal resistance, mechanical strength and electrical properties as compared with conventional engineering plastics represented by polyethylene terephthalate, polybutylene terephthalate, polyether sulfone, polysulfone and polyphenylene sulfide. Consequently, the polyimide resin having improved processability in addition to its substantially outstanding characteristics can be expected to be used in fields where conventional engineering plastics are not satisfactory.

SUMMARY OF THE INVENTION

One object of the present invention is to provide a polyimide-based molding resin composition having excellent flowability in a molten state in addition to its substantially outstanding characteristics.

Another object of the present invention is to provide a polyimide-based resin composition having an increased rate of crystallization and an improved dimensional stability of molded articles in a heat-treatment step.

Still another object of the invention is to provide a polyimide-based resin composition for low friction materials which has excellent sliding property and mechanical characteristics in addition to outstanding heat resistance and toughness.

A further object of the invention is to provide a polyimide-based resin composition for low friction materials which is excellent in sliding property, has improved processability without impairing the thermal properties of polyimide resin, and can be heat-treated for post-crystallization.

A still further object of the invention is to provide a polyimide-based resin composition which is excellent in heat resistance, dimensional stability of molded articles in the heat treatment step for post-crystallization and mechanical properties, and a polyimide-based resin composition having excellent mechanical characteristics and good dimensional stability in molding shrinkage.

An additional object of the invention is to provide a polyimide-based resin composition which is excellent in processability and has improved mechanical characteristics, heat resistance and chemical resistance due to an increased rate of crystallization.

As a result of an intensive investigation in order to accomplish these objects, the present inventors have found that a polyimide-based composition comprising the novel polyimide and polyether ketone resin and/or polyester resin is particularly effective for achieving the above objects.

They have further found a polyimide resin composition comprising polyimide resin and a thermotropic liquid crystal polymer wherein:

① the sliding property can be remarkably improved by formulating a cured phenolic resin and a solid lubricant, ② by formulating one or more additives selected from the group consisting of fluororesin, graphite and aromatic polyamide resin, the sliding property can be remarkably improved and the dimensional stability of molded articles in the heat treatment for post-crystallization is markedly enhanced to make heat treatment possible, ③ a high-strength sliding material having excellent sliding property and mechanical characteristics can be obtained by formulating a fluororesin and carbon fibers, ④ mechanical properties can be remarkably improved by formulating carbon fibers and wherein mechanical strength can be critically enhanced depending upon the amount of formulation, ⑤ a resin composition having remarkably improved mechanical properties and good dimensional stability of molded articles can be obtained by formulating potassium titanate fibers, and ⑥ the processability and crystallization rate of polyimide-based resin can be improved by adding a crystallization accelerator. Thus the present invention has been completed.

Accordingly, one aspect of the present invention is a resin composition comprising from 99.9 to 50% by weight of a polyimide having recurring units represented by the formula (I):

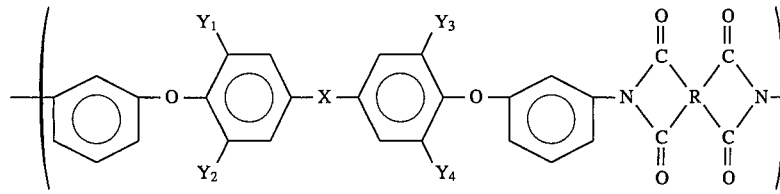

wherein X, $Y_1$, $Y_2$, $Y_3$, $Y_4$ and R are the same as above, preferably represented by the formula (II):

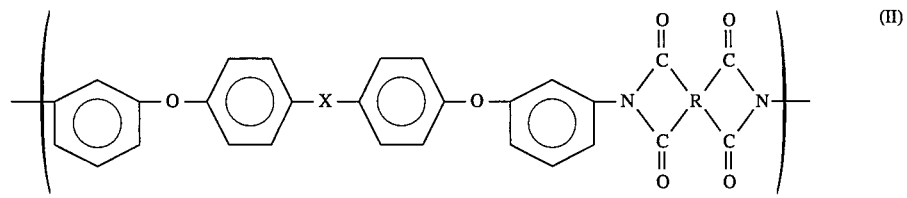

wherein X and R are the same as above, and from 0.1 to 50% by weight of a polyether ketone resin and/or a polyester resin.

In the resin composition of the present invention, the polyether ketone resin is preferably represented by the formula (III):

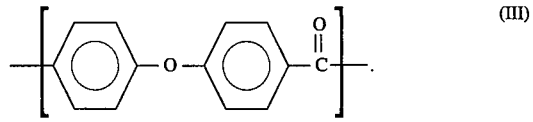

Further, in the resin composition of the present invention, the polyester resin has preferably recurring structural units represented by the formula (IV):

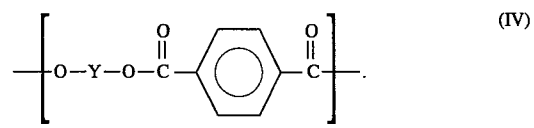

wherein Y is an aliphatic radical having from 1 to 4 carbon atoms or a radical represented by

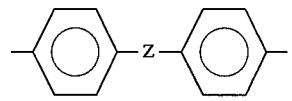

wherein Z is a direct bond, $$-\underset{CH_3}{\overset{CH_3}{\underset{|}{\overset{|}{C}}}}-, \quad -\underset{O}{\overset{O}{\underset{\|}{\overset{\|}{S}}}}-, \quad -CH_2-, \quad -O-, \quad -CO-,$$

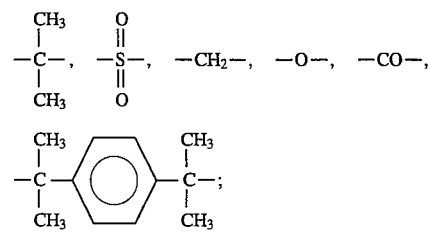

the polyester resin can more preferably form an anisotropic molten phase at a temperature of 420° C. or less; and the polyester resin is most preferably a thermotropic liquid-crystal polymer obtained by conducting polymerization so that the polyester bond is formed by basic structural units of the formulas (V), (VI), (VII) and (VIII):

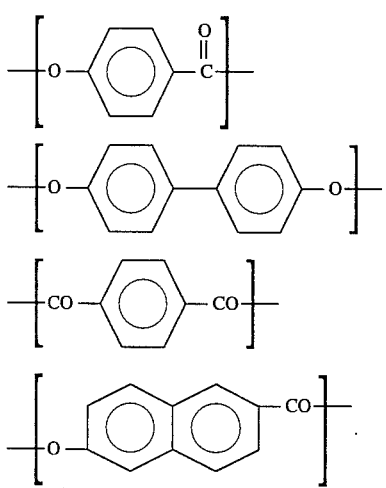

A second aspect of the invention is a polyimide resin composition for low friction materials comprising from 3 to 50 parts by weight of a cured phenolic resin and from 1 to 25 parts by weight of solid lubricant for 100 parts by weight of a resin composition comprising from 50 to 99 parts by weight of the polyimide having recurring units represented by the above formula (I) and from 50 to parts by weight of a thermotropic liquid crystal polymer.

A third aspect of the invention is a polyimide resin composition for low friction materials comprising from 1 to 150 parts by weight of one or more additives selected from the group consisting of fluororesin, graphite and aromatic polyamide resin for 100 parts by weight of a resin composition comprising from 50 to 99 parts by weight of the polyimide having recurring units represented by the above formula (I) and from 50 to 1 parts by weight of a thermotropic liquid crystal polymer.

A fourth aspect of the invention is a polyimide resin composition for low friction materials comprising from 1 to 60 parts by weight of fluororesin and from 5 to 160 parts by weight of carbon fibers for 100 parts by weight of a resin composition comprising from 50 to 99 parts by weight of the polyimide having recurring units represented by the above formula (I) and from 50 to 1 parts by weight of a thermotropic liquid crystal polymer.

A fifth aspect of the invention is a carbon fiber reinforced polyimide resin composition comprising from 5 to 50 parts by weight of carbon fibers for 100 parts by weight of a resin composition comprising from 50 to 99 parts by weight of the polyimide having recurring units represented by the above formula (I) and from 50 to 1 parts by weight of a thermotropic liquid crystal polymer.

A sixth aspect of the invention is a polyimide-based resin composition comprising from 5 to 200 parts by weight of potassium titanate fibers for 100 parts by weight of a resin composition comprising from 50 to 99 parts by weight of the polyimide having recurring units represented by the above formula (I) and from 50 to 1 parts by weight of a thermotropic liquid crystal polymer.

A seventh aspect of the invention is a polyimide-based resin composition comprising from 0.01 to 25 parts by weight of a crystallization accelerator for 100 parts by weight of a resin composition comprising from 50 to 99 parts by weight of the polyimide having recurring units represented by the above formula (I) and from 50 to 1 parts by weight of a thermotropic liquid crystal polymer.

In these polyimide-based resin compositions which contain additional additives, the thermotropic liquid crystal polymer which can be preferably used is one or more polymers having basic structure selected from the group consisting of the above formulas (V), (VI), (VII) and VIII).

The fluororesin which can be preferably used in the third and fourth aspects of the invention is one or more fluororesins selected from the group consisting of the following (a) to (f).

(a) Tetrafluoroethylene resin having in the molecule recurring structural units represented by the formula:

$$—(CF_2CF_2)—.$$

(b) Tetrafluoroethylene-hexafluoropropylene copolymer resin having in the molecule recurring structural units represented by the formulas:

$$—(CF_2CF_2)—$$

and $$—[CF(CF_3)CF_2]—.$$

(c) Tetrafluoroethylene-perfluoroalkylvinyl ether copolymer resin having in the molecule recurring structural units represented by the formulas:

$$—(CF_2CF_2)— \text{ and}$$

$$—[CF(OC_mF_{2m+1})CF_2]—$$

wherein m is an integer.

(d) Tetrafluoroethylene-ethylene copolymer resin having in the molecule recurring structural units represented by the formula:

$$—(CF_2CF_2)—$$

and $$—(CH_2CH_2)—.$$

(e) Trifluorochloroethylene-ethylene copolymer resin having in the molecule recurring structural units represented by the formula:

$$—(CFClCF_2)— \text{ and}$$

$$—(CH_2CH_2)—.$$

(f) Fluorovinylidene resin having in the molecule recurring structural units represented by the formula:

$$—(CF_2CH_2)—.$$

The aromatic polyamide resin which can be used in the third aspect of the invention is preferably one or more resins selected from the group consisting of the formulas (IX), (X) and (XI):

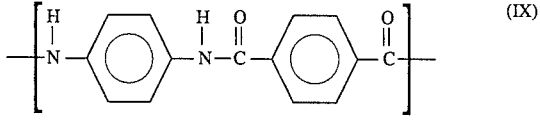

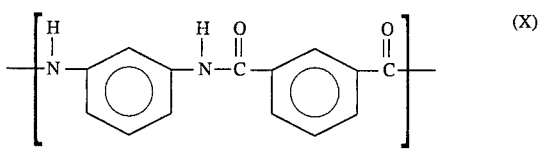

-continued

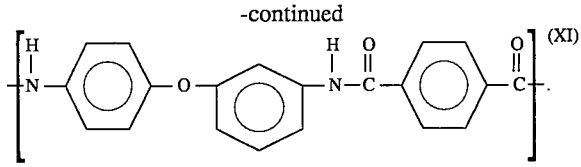

Further, the preferred crystallization accelerator which can be used in the seventh aspect of the invention is one or more inorganic compounds selected from the group consisting of calcium chloride, aluminum phosphate, hydrotalcite compounds, sodium chloride and graphite, or one or more organic compounds represented by the formulas (XII) and (XIII):

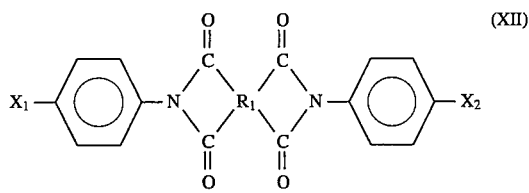

wherein $R_1$ is a tetravalent radical selected from the group consisting of an aliphatic radical and alicyclic radical having from 2 to 10 carbon atoms, respectively, and phenyl radical, and may be the same as or different from R in the formula (I); and $X_1$ and $X_2$ are one or more radicals selected from the group consisting of hydrogen, chlorine, bromine, fluorine, lower alkyl and lower alkoxy radical having from 1 to 10 carbon atoms, respectively; and

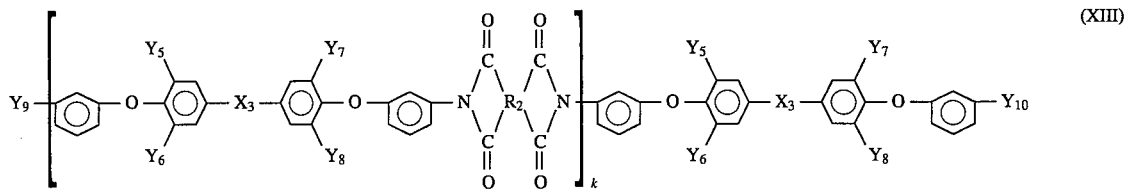

wherein K is an integer of from 1 to 10, $X_3$ is one or more divalent radicals selected from the group consisting of a direct bond, hydrocarbon having from 1 to 10 carbon atoms, hexafluorinated isopropylidene, carbonyl, thio and sulfonyl; $Y_5$, $Y_6$, $Y_7$ and $Y_8$ are individually one or more divalent radicals selected from the group consisting of hydrogen, chlorine, bromine, lower alkyl and lower alkoxy radical having from 1 to 10 carbon atoms, respectively; $R_2$ is a tetravalent radical selected from the group consisting of an aliphatic radical and alicyclic radical having from 2 to 10 carbon atoms, respectively, and phenyl; $X_3$, $Y_5$, $Y_6$, $Y_7$, $Y_8$, and R may be individually the same as or different from the radicals having the same symbols in the formula (I); and $Y$, and $Y_{10}$ are —H, —$NH_2$ or

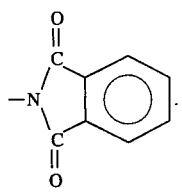

In any composition of the invention, the polyimide resin used preferably has an inherent viscosity of from 0.3 to 0.7 dl/g at 35° C. in a solution containing 0.5 g of the resin in 100 ml of a solvent mixture composed of 90 parts by weight of p-chlorophenol and 10 parts by weight of phenol.

The resin composition of the present invention has remarkably improved processability and enhanced dimensional stability of molded articles upon a heat treatment (annealing) step without impairing the excellent characteristics of the polyimide resin.

By blending a polyester capable of forming an anisotropic molten phase, the rate of crystallization is remarkably accelerated and the polyimide resin based composition can shift its exothermic temperature ($Tc_1$) of crystallization to the lower temperature side in a temperature-rise step.

The polyimide-based resin composition of the invention for low friction materials has excellent processability and the molded articles obtained from the composition have a low friction coefficient without impairing heat resistance and mechanical characteristics which are essential features of the above resin composition and is also extremely outstanding in wear resistance. The molded articles of the resin composition also have excellent dimensional stability in heat treatment. Further, the composition comprising the crystallization accelerator has a remarkably increased rate of crystallization in addition to the excellent processability and can provide in economy a resin having excellent mechanical characteristics and heat and chemical resistances.

DESCRIPTION OF THE PREFERRED EMBODIMENTS

The polyimide used in the present invention is represented by the above formula (I).

The polyimide can be prepared by reacting an ether diamine represented by the formula (XIV):

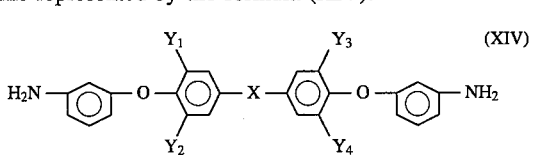

wherein x, $Y_1$, $Y_2$, $Y_3$ and $Y_4$ are the same as above, preferably an ether diamine represented by the formula (XV):

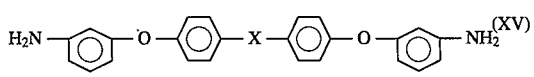

wherein X is the same as above, with one or more tetracarboxylic dianhydrides.

That is, the polyimide can be prepared by reacting the ether diamine with the tetracarboxylic dianhydride in a solvent and then thermally or chemically imidizing the resultant polyamic acid.

The reaction temperature is usually 250° C. or less. No particular restriction is imposed upon the reaction pressure. The reaction can be satisfactorily carried out under atmospheric pressure.

The reaction time varies depending upon the tetracarboxylic dianhydride used, the kind of solvent, and the reaction temperature.

The reaction is usually carried out for a time sufficient to complete formation of the polyamic acid intermediate. Sufficient reaction times are 24 hours or less, an hour or less in some cases.

The above reaction provides the polyamic acid corresponding to the recurring structural units of the formula (I). The polyamic acid is successively heat-dehydrated at 100° to 400° C. or chemically imidized by using a conventional imidizing agent to obtain the polyimide having recurring structural units of the formula (I).

Polyimide can also be prepared by simultaneously conducting polyamic acid formation and the heat-imidizing reaction.

The diamine compound for use in the preparation of the above polyimide which is used for the principal component in the composition of the present invention is represented by the above formula (XIV).

Exemplary diamine compounds include, for example:
bis[4-(3-aminophenoxy)phenyl]methane,
1,1-bis[4-(3-aminophenoxy)phenyl]ethane,
1,2-bis[4-(3-aminophenoxy)phenyl]ethane,
2,2-bis[4-(3-aminophenoxy)phenyl]propane,
2-[4-(3-aminophenoxy)phenyl]-2-(4-(3-aminophenoxy)-3-methylphenyl] propane,
2,2-bis[4-(3-aminophenoxy)-3-methylphenyl]propane,
2-[4-(3-aminophenoxy)phenyl]-2-[4-(3-aminophenoxy)-3,5-dimethylphenyl] propane,
2,2-bis[4-(3-aminophenoxy)-3,5-dimethylphenyl]propane,
2,2-bis[4-(3-aminophenoxy)phenyl]butane,
2,2-bis[4-(3-aminophenoxy)phenyl]-1,1,1,3,3,3-hexafluoropropane,
4,4'-bis(3-aminophenoxy)biphenyl,
4,4'-bis(3-aminophenoxy)-3-methylbiphenyl,
4,4'-bis(3-aminophenoxy)-3,3'-dimethylbiphenyl,
4,4'-bis(3-aminophenoxy)-3,5-dimethylbiphenyl,
4,4'-bis(3-aminophenoxy)-3,3',5,5'-tetramethylbiphenyl,
4,4'-bis(3-aminophenoxy)-3,3'-dichlorobiphenyl,
4,4'-bis(3-aminophenoxy)-3,5-dichlorobiphenyl,
4,4'-bis(3-aminophenoxy)-3,3',5,5'-tetrachlorobiphenyl,
4,4'-bis(3-aminophenoxy)-3,3'-dibromobiphenyl,
4,4'-bis(3-aminophenoxy)-3,5-dibromobiphenyl,
4,4'-bis(3-aminophenoxy)3,3',5,5'-tetrabromobiphenyl,
bis[4-(3-aminophenoxy)phenyl]ketone,
bis[4-(3-aminophenoxy)phenyl]sulfide,
bis[4-(3-aminophenoxy)-3-methoxyphenyl]sulfide,
[4-(3-aminophenoxy)phenyl][4-(3-aminophenoxy)-3,5-dimethoxyphenyl] sulfide,
bis[4-(3-aminophenoxy)-3,5-dimethoxyphenyl]sulfide,
bis[4-(3-aminophenoxy)phenyl]sulfone,
bis[4-(3-aminophenoxy)phenyl]ether,
bis[4-(4-aminophenoxy)phenyl]ether,
1,4-bis[4-(3-aminophenoxy)phenoxy]benzene,
1,4-bis[4-(4-aminophenoxy)phenoxy]benzene,
1,4-bis[4-(3-aminophenoxy)benzoyl]benzene,
1,3-bis[4-(3-aminophenoxy)benzoyl]benzene,
bis[4{4-(4-aminophenoxy)phenoxy}phenyl]sulfone,
and bis[4{4-(4-aminophenoxy)phenoxy}phenyl]ketone.

The diamine compound may be used a single compound or a mixture thereof.

The tetracarboxylic dianhydride which is another raw material for preparing polyimide of the formula (I) is represented by the formula (XVI):

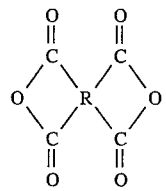

(XVI)

wherein R is the same as above.

In the tetracarboxylic dianhydride represented by the formula (XVI), R is preferably a tetravalent radical represented by the formula (XVII):

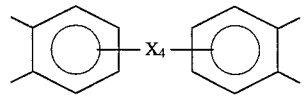

(XVII)

wherein $X_4$ is a direct bond, —O—, —S—, —SO$_2$, —CH$_2$, —CO—, —C(CH$_3$)$_2$—, —C(CF$_3$)$_2$—

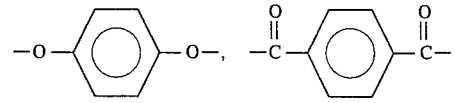

or

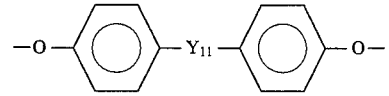

wherein $Y_{11}$ is a direct bond, —O—, —S—, —SO$_2$—, —CH$_2$—, —CO—, —C(CH$_3$)$_2$— or —C(CF$_3$)$_2$—.

Consequently, in the polyimide of the formula (I), R is preferably represented by the formula (XVII).

The tetracarboxylic dianhydrides used as a raw material in the preparation of polyimide include, for example,
ethylenetetracarboxylic dianhydride,
butanetetracarboxylic dianhydride,
cyclopentanetetracarboxylic dianhydride,
pyromellitic dianhydride,
3,3',4,4'-benzophenonetetracarboxylic dianhydride,
2,2',3,3'-benzophenonetetracarboxylic dianhydride,
3,3',4,4'-biphenyltetracarboxylic dianhydride,
2,2',3,3'-biphenyltetracarboxylic dianhydride,
2,2-bis(3,4-dicarboxyphenyl)propane dianhydride,
2,2-bis(2,3-dicarboxyphenyl)propane dianhydride,
bis[3,4-dicarboxyphenyl)ether dianhydride,
bis(3,4-dicarboxyphenyl)sulfone, dianhydride,
1,1-bis(2,3-dicarboxyphenyl)ethane dianhydride,
bis(2,3-dicarboxyphenyl)methane dianhydride,
bis(3,4-dicarboxyphenyl)methane dianhydride,
-[4-(3,4-dicarboxyphenoxy)phenoxy]phthalic dianhydride,
2,3,6,7-naphthalenetetracarboxylic dianhydride,
1,4,5,8-naphthalenetetracarboxylic dianhydride,
1,2,5,6-naphthalenetetracarboxylic dianhydride,
1,2,3,4-benzenetetracarboxylic dianhydride,
3,4,9,10-perylenetetracarboxylic dianhydride,
2,3,6,7-anthracenetetracarboxylic dianhydride,
and 1,2,7,8-phenanthrenetetracarboxylic dianhydride.

The tetracarboxylic dianhydride can be used singly or in combination.

The polyimide used in the composition of the invention is prepared by using the above ether diamine as a raw material. The polyimide prepared by simultaneous use of other diamines can also be used for the composition of the invention as long as no adverse effect is found on the good properties of the polyimide.

Exemplary diamines which can be simultaneously used include m-phenylenediamine, o-phenylenediamine, p-phenylenediamine, m-aminobenzylamine, p-aminobenzylamine, bis(3-aminophenyl) ether, (3-aminophenyl)(4-aminophenyl) ether, bis(4-aminophenyl) ether, bis(3-aminophenyl) sulfide, (3-aminophenyl)(4-aminophenyl) sulfide, bis(4-aminophenyl) sulfide, bis(3-aminophenyl) sulfoxide, (3-aminophenyl)(4-aminophenyl) sulfoxide, bis(4-aminophenyl) sulfoxide, bis(3-aminophenyl) sulfone, (3-aminophenyl)(4-aminophenyl) sulfone, bis(4-aminophenyl) sulfone, 3,3'-diaminobenzophenone, 3,4'-diaminobenzophenone, 4,4'-diaminobenzophenone, bis[4-(4-aminophenoxy)phenyl]methane, 1,1-bis[4-(4-aminophenoxy)phenyl]ethane, 1,2-bis[4-(4-aminophenoxy)phenyl]ethane, 2,2-bis[4-(4-aminophenoxy)phenyl]propane, 2,2-bis[4-(4-aminophenoxy)phenyl]butane, 2,2-bis[4-(4-aminophenoxy)phenyl]-1,1,1,3,3,3-hexafluoropropane, 1,3-bis(3-aminophenoxy)benzene, 1,3-bis(4-aminophenoxy)benzene, 1,4-bis(3-aminophenoxy)benzene, 1,4-bis(4-aminophenoxy)benzene, 4,4'-bis(4-aminophenoxy)biphenyl, bis[4-(4-aminophenoxy)phenyl]ketone, bis[4-(4-aminophenoxy)phenyl]sulfide, bis[4-(4-aminophenoxy)phenyl]sulfoxide, bis[4-(4-aminophenoxy)phenyl]sulfone, bis[4-(3-aminophenoxy)phenyl]ether, bis[4-(4-aminophenoxy)phenyl]ether, 1,4-bis[4-(4-aminophenoxy)benzyl]benzene, and 1,4-bis[4-(4-aminophenoxy)benzyl]benzene.

The resin composition of the present invention can be obtained by blending the above polyimide resin with the following components.

That is, the component to be blended with the polyimide resin in the composition of the invention is polyether ketone resin, polyester resin or a mixture of these resins.

Polyether ketone resin is a thermoplastic resin having recurring units represented by the above formula (III):

For example, a representative commercial product is VICTREX PEK (Trade Mark of I.C.I. Ltd.).

Polyester resin used in the invention includes the following types of resins.

① A polymer obtained by the reaction of at least one divalent phenol, aliphatic diol and/or alicyclic diol with at least one dicarboxylic acid and/or a dicarboxylic acid derivative.

② A copolymer consisting of at least three components and having a polyester structure as a whole, the copolymer comprising at least one divalent phenol, aliphatic diol and/or alicyclic diol; at least one dicarboxylic acid and/or a dicarboxylic acid derivative; and additionally at least one hydroxycarboxylic and/or a hydroxycarboxylic acid derivative.

The copolymer may contain polyester obtained by reacting at least one hydroxycarboxylic acid and/or its derivative.

Exemplary polyesters include those illustrated below.

1) The polyester resin consisting principally of one or two component polyesters obtained by the reaction of a divalent phenol, aliphatic diol or alicyclic diol with a dicarboxylic acid or dicarboxylic acid derivative, or with a hydroxycarboxylic acid or hydroxycarboxylic acid derivative, and having recurring units represented by the following formulas:

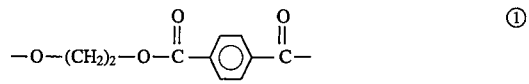

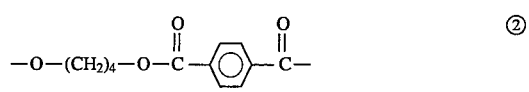

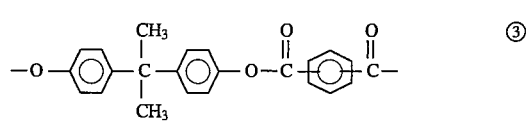

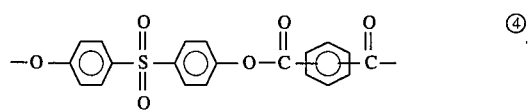

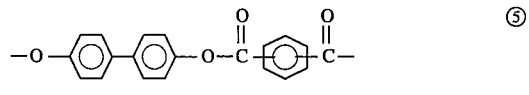

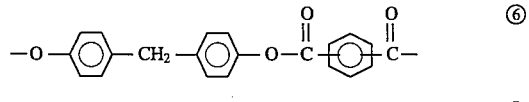

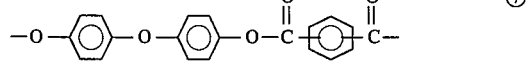

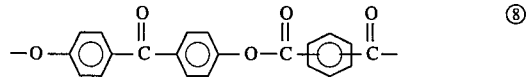

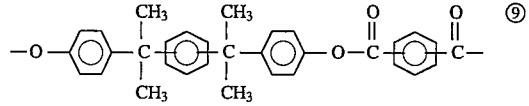

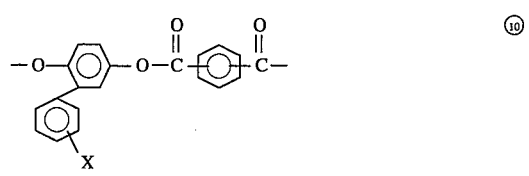

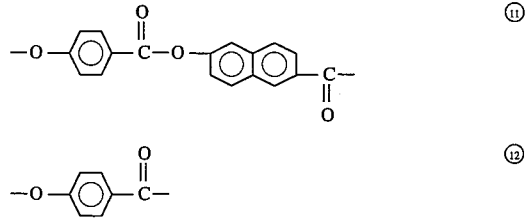

wherein two carbonyl radicals are situated with respect to each other in the ortho, meta or para position or mixture of these positions in the formulas from ③ to ⑩ and X is hydrogen, fluorine, chlorine, bromine or an alkyl radical in the formula ⑩.

2) The copolymer consisting of at least three components, a having polyester structure as a whole, and having a combination of a divalent phenol or diol radical, dicarboxylic acid radical and a hydroxycarboxylic acid radical, the combination being illustrated by the formulas:

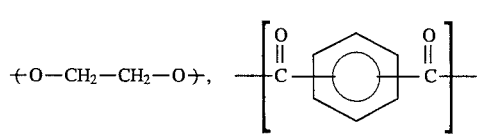 ①
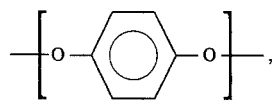
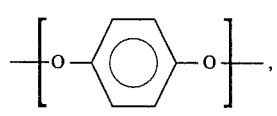
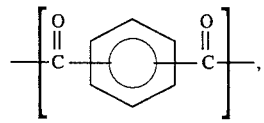 ②
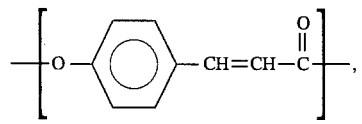
 ③
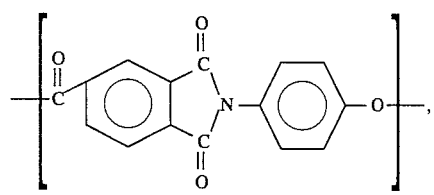
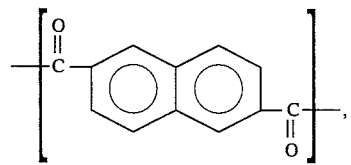
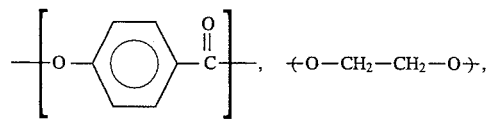 ④
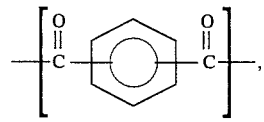
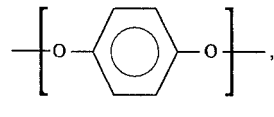
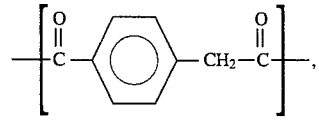 ⑤
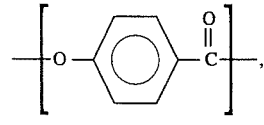
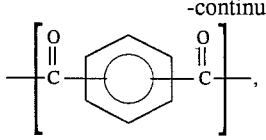 ⑥
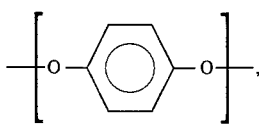
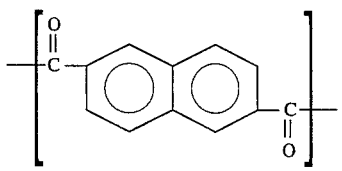
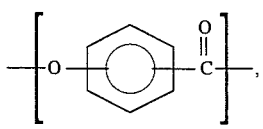 ⑦
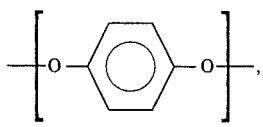
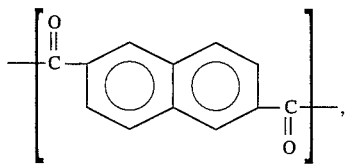
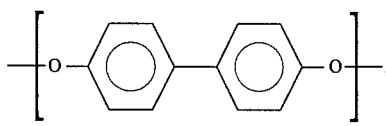 ⑧
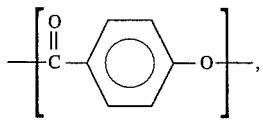
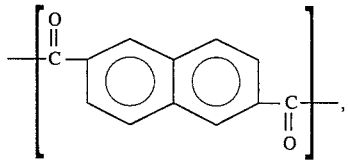
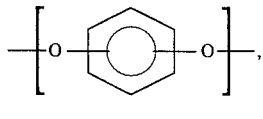
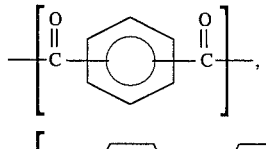
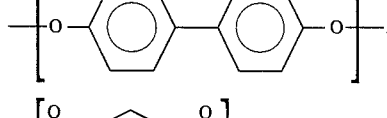 ⑨
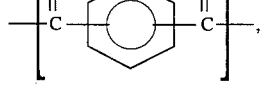

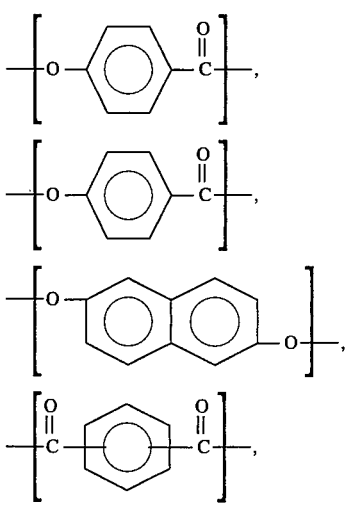

The polyester used for the invention is of course not limited to those illustrated above.

Many kinds of polyesters having various polymerization degrees are commercially available and the polyester having a suitable melt viscosity characteristic for the desired composition can be arbitrarily selected in the market.

The polyester resin has preferably recurring structural units represented by the formula (IV):

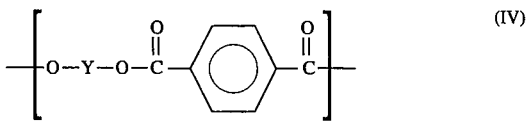

wherein Y is an aliphatic radical having from 1 to 4 carbon atoms or a radical represented by

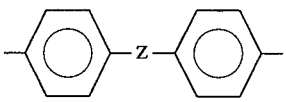

wherein Z is a direct bond, —C(CH$_3$)$_2$—, —SO$_2$—, —CH$_2$—, —O—, —CO— or

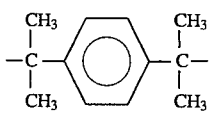

; the polyester resin can more preferably form an anisotropic molten phase; and the most preferred polyester resin forms the molten phase at a temperature of 420° C. or less.

The polyester which forms such anisotropic molten phase, that is, the polyester which is a so-called thermotropic liquid-crystal polymer is most preferably obtained by carrying out polymerization so that polyester bond is formed by basic structural units of the formulas (V), (VI) ,(VII) and (VIII):

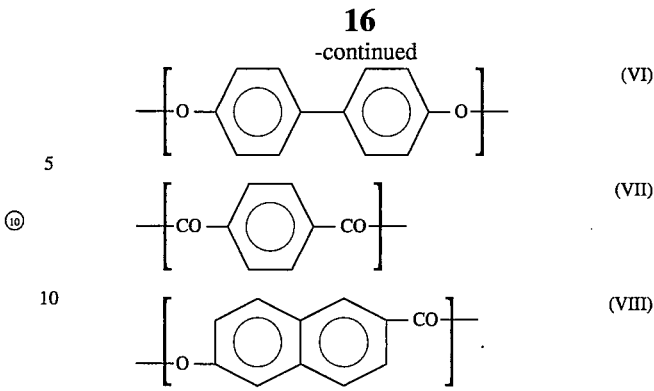

The molding resin composition of the invention is prepared by blending from 99.9 to 50% by weight of the above polyimide resin and from 0.1 to 50% by weight of the polyether ketone resin and/or the polyester resin.

The resin composition of the invention exhibits remarkable low melt viscosity in a high temperature range of 300° C. or more. The polyester resin provides a good fluidizing effect on the resin composition and the effect can be observed even in a small amount. The lower limit of the polyester resin content in the composition is 0.1%, preferably 0.5% by weight.

The composition obtained by using a polyester which does not form an anisotropic molten phase is insufficient in chemical resistance and mechanical strength as compared with the composition obtained by using polyester which forms an anisotropic molten phase. On the other hand, the polyester which forms an anisotropic molten phase can provide excellent performance, that is, chemical resistance, flame retardance and mechanical strength which are superior to those of conventional thermal-resistant resins.

When some kinds of anisotropic molten phase forming polyesters are used in a large amount, it is liable to cause problems such as too high anisotropy of mechanical properties, formation of fibrils, and insufficient weld strength. Thus the polyester resin is controlled to a smaller amount in the composition. Usually the preferred amount of the polyester resin is 50% by weight or less.

The composition of the invention can be prepared by generally known processes. For example, preferred processes are illustrated below.

① A process for preparing powder by preblending polyimide resin powder and polyester ketone resin powder and/or polyester resin powder in a mortar, Henschel mixer, drum blender, tumbler, ball mill and ribbon blender.

② A process for preparing powder by previously dissolving or suspending polyimide resin powder in an organic solvent, adding polyether ketone resin and/or polyester resin to the resulting solution or suspension, dispersing uniformly and thereafter removing the solvent.

③ A process for preparing powder by suspending polyether ketone resin and/or polyester resin in an organic solvent solution of polyamic acid which is the precursor of polyimide in the invention, carrying out heat-treatment at 100° to 400° C. or chemical imidization by using a conventional imidizing agent, and then removing the solvent.

The powdery polyimide resin composition thus obtained can be used as such for various molding processes, for example, injection molding, compression molding transfer molding. However, molding is more preferably carried out after melting and mixing each component of the composition.

In the preparation of a melt-mixed composition, it is also a simple and effective method to mix and mold powders with each other, pellets with each other, or powder and pellets.

Melt-mixing can be conducted by utilizing equipment for melt-blending common rubber or plastics, for example, hot rolls, Banbury mixer, Brabander and an extruder.

Melt-mixing is carried out in the range of from the melt temperature to the decomposition-initiating temperature of the formulation. The temperature is usually from 250° to 420° C., preferably from 300° to 400° C.

As to the process for molding the resin composition of the invention, a suitable process is injection molding or extruding which is a process capable of forming a uniformly melted blend and which has a high productivity. Other molding processes such as transfer molding, compression molding and sinter molding can also be applied without any problem.

In the present invention, one or more additives can be added to the composition, if desired.

Exemplary additives which can be used include, fillers such as calcium carbonate, mica, glass beads, graphite, and molybdenum disulfide; fiber reinforcements such as glass fibers, carbon fibers, ceramic fibers, aramide fibers, potassium titanate fibers and metal fibers; lubricants; release agents; stabilizers; colorants; other thermoplastic resin such as polyphenylene sulfide, polyether imide, polyether sulfone, and polyether ether ketone; and thermosetting resins such as phenol resin, epoxy resin, silicone resin and polyamide imide resin.

① The composition of the invention comprising these other additives will be illustrated hereinafter.

The various compositions described below are polyimide-based compositions obtained by adding other additives to the polyimide composition comprising 50 to 99% by weight of polyimide resin represented by the formulas (I) and (II) and from 50 to 1% by weight of a thermotropic liquid crystal polymer which are fundamental components.

In these resin compositions, the proportion of the thermotropic liquid crystal polymer exceeding 50% by weight decreases weld strength of the resultant resin composition and anisotropy becomes dominant. A proportion less than 1% by weight leads to insufficient processability and slow rate of crystallization in the resulting resin composition and dimensional stability of molded articles in the heat-treatment (annealing) step cannot be improved.

Particularly preferred polyimide used in these resin compositions has the above formula (I) wherein R is an aliphatic radical having from 4 to 9 carbon atoms, alicyclic radical having from 4 to 10 carbon atoms, monoaromatic radical having the formula:

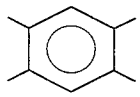

condensed polyaromatic radical having the formula:

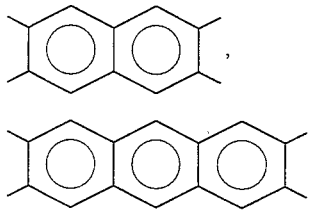

, and noncondensed aromatic radical which is obtained by connecting aromatic radicals each other with a direct bond or a bridge member and has the formula:

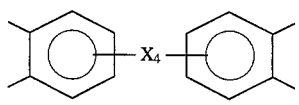

(XI)

wherein $X_4$ is a direct bond, —O—, —S—, —SO$_2$, —CH$_2$, —CO—, —C(CH$_3$)$_2$—,

—C(CF$_3$)$_2$—,

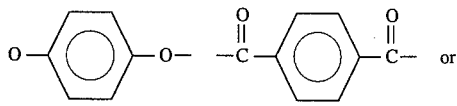 or

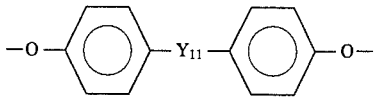

wherein $Y_{11}$ is a direct bond, —O—, —S—, —SO$_2$—, —CH$_2$—, —CO—, —C(CH$_3$)$_2$— or —C(CF$_3$)$_2$—.

The polyimide resin has an inherent viscosity of usually in the range of from 0.35 to 0.65 dl/g, preferably from 0.40 to 0.60 dl/g. The inherent viscosity is measured at 35° C. in a solution containing 0.5 g of the polyimide in 100 ml of a solvent mixture consisting of 90% by weight of p-chlorophenol and 10% by weight of phenol. When the inherent viscosity is less than 0.35 dr/g, mechanical properties and durability are unsatisfactory. On the other hand, an inherent viscosity exceeding 0.65 dl/g impaired processability and injection molding becomes difficult.

A composition which comprises other additives of the invention is a polyimide-based resin composition for low friction materials (hereinafter referred to as composition B) which comprises cured. phenolic resin and solid lubricant in addition to the polyimide represented by the above formula (II) and the thermotropic liquid crystal polymer.

In the composition B, a preferred polyimide is represented by the formula(II) and a preferred thermotropic liquid crystal polymer has the formulas (V), (VI), (VII) and (VIII).

Cured phenolic resin is prepared by reacting phenols with a formaldehyde generating compound, adding conventionally known fillers to the resulting novolak type or resol type resin, if desired, heating the thus-obtained mixture as intact or after adding a crosslinking agent such as hexamethylenetetramine and crushing the resultant cured product. The preparation process has been disclosed in Japanese Laid-Open Patents Sho 57-17701 and 58-17114 and many other patents. Marketed products include Bellpearl (Trade mark; Kanebo Co.).

The cured phenolic resin which can be used for the composition of the invention is a heat infusible resin in the form of granules or powder. The phenolic resin has an average particle size of 50 µm or less and 80% by weight or more of the resin preferably has a particle size of 150 µm or less.

In the case of too large a particle size of the cured phenolic resin, adhesion of particles to each other in the powder becomes insufficient in the molding step, leads to fluctuation in the properties of the molded articles and unfavorably lowers mechanical strengths such as wear resistance and flexural strength.

The phenol resin must be cured sufficiently. The degree of cure is indicated, for example, by "methanol solubility as a scale. Methanol Solubility is measured by accurately weighing about 10 g of the resin sample (the weight is W$_0$), heat-treating the sample under reflux of 500 ml of 100% methanol for 30 minutes, followed by filtering through a glass filter, washing the filter residue with 100 ml of methanol and washing the filter residue at 70° C. for 2 hours (the dried weight of the residue is $W_1$). The methanol solubility is calculated by the following equation.

$$\text{Methanol solubility (\% by weight)} = \frac{W_0 - W_1}{W_0} \times 100$$

The methanol solubility of the cured phenolic resin is usually 20% by weight or less, preferably 15% by weight or less. When the methanol solubility exceeds 20% by weight, vaporization takes place in the molding step and the molded article unfavorably generates voids or fine cracks in some cases.

The amount of the cured phenolic resin is in the range of from 3 to 50 parts by weight, preferably from 8 to 40 parts by weight for 100 parts by weight of the sum of the polyimide resin and the thermotropic liquid crystal polymer. An amount less than 3% by weight is not effective for wear resistance. On the other hand, amount exceeding 50% by weight leads to an increase melt viscosity of the composition which makes melt molding impossible and additionally the friction coefficient cannot be lowered, which is unfavorable for sliding materials.

The solid lubricant for use in the composition of the invention is blended together with the above cured phenolic resin in order to improve the sliding property of the matrix resin. Exemplary solid lubricants include tetrafluoroethylene resin (hereinafter referred to as PTFE), graphite, molybdenum disulfide, wolfram disulfide, fluorographite, boron nitride, silicon nitride and metal oxides such as lead monoxide.

The amount of the solid lubricant is usually from 1 to .25 parts by weight, preferably from 3 to 14 parts by weight for 100 parts by weight of the sum of the polyimide resin and the thermotropic liquid crystal polymers. When the amount is less than 1 parts by weight no improvement is found on the sliding property. On the other hand, an amount exceeding 25 parts by weight lowers essential mechanical strength of the aromatic polyimide resin.

The polyimide-based resin composition of the invention for low friction materials can be further blended, if desired, with other materials including carbon fibers, glass fibers, optical fibers, ceramic fibers, potassium titanate fibers, metal fibers, boron fibers, silicon carbide fibers, asbestos, rock wool and other fibrous reinforcement; calcium carbonate, mica, glass beads, graphite, molybdenum disulfide, clay, silica, alumina, talc, diatomaceous earth, hydrated alumina, silicate balloons and other fillers; lubricants, releasing agents, stabilizers, colorants, crystal nucleating agents and other miscellaneous additives; other thermoplastic resins such as polyphenylene sulfide, polyetherimide, polyether sulfone and polyether ketone; and thermosetting resins such as epoxy resin, silicone resin and polyamideimide resin.

No particular restriction is imposed on the means for mixing various raw materials in order to prepare the polyimide-based resin composition of the invention for sliding materials. The raw materials can be individually fed to a melt kneader. Alternatively, the raw materials can be previously mixed with a common mixer such as Henschel mixer, ball mixer and ribbon blender and then fed to the melt kneader. Melt kneading is usually carried out at 250° to 420° C., preferably 300° to 400° C.

The polyimide-based resin composition of the invention for sliding materials can of course be hot-molded by compression molding or sinter molding, or can be processed by injection molding or extrusion forming with high productivity after forming uniform molten blend.

Other compositions are polyimide-based resin compositions for low friction materials (hereinafter referred to as composition C) which comprises one or more components selected from the group consisting of fluororesin, graphite and aromatic polyamide resin in addition to the polyimide represented by the above formula (I) and the thermotropic liquid crystal polymer.

The term fluororesin means a synthetic high polymer containing fluorine atoms (F) in the molecule. The fluororesin is generally excellent in heat resistance, chemical resistance and electrical characteristics as compared with other synthetic resins and also has essentially low friction features and nonadhesive property.

Practical examples are one or more fluororesins selected from the group consisting of the following (a) to (f).

(a) Tetrafluoroethylene resin having in the molecule recurring structural units represented by the formula:

$—(CF_2CF_2)$, (b) Tetrafluoroethylene-hexafluoropropylene copolymer resin having in the molecule recurring structural units represented by the formula:

$—(CF_2CF_2)—$ and $—[CF(CF_3)CF_2]—.$ (c) Tetrafluoroethylene-perfluoroalkylvinyl ether copolymer resin having in the molecule recurring structural units represented by the formulas:

$—(CF_2CF_2)—$ and $—(CF(OC_mF_{2+1})CF_2]—$ wherein m is an integer.

(d) Tetrafluoroethylene-ethylene copolymer resin having in the molecule recurring structural units represented by the formula:

$—(CF_2CF_2)—$ and $—(CH_2CH_2)—.$ (e) Trifluorochloroethylene-ethylene copolymer resin having in the molecule recurring structural units represented by the formula:

$—(CFClCF_2)—$ and $—(CH_2CH_2)—.$ (f) Fluorovinylidene resin having in the molecule recurring structural units represented by the formula:

$—(CF_2CH_2)—.$

Particularly, tetrafluoroethylene resin (PTFE) of the formula (a) is outstanding in these properties and is most preferably used in the composition C.

The fluororesin used in the Polyimide-based resin composition C is usually in the form of powder and has a particle size of from 1 to 5 μm, preferably from 5 to 10 μm.

The aromatic polyamide resin which can be used in the third aspect of the invention is preferably one or more resins having recurring units selected from the group consisting of the formulas (IX), (X) and (XI):

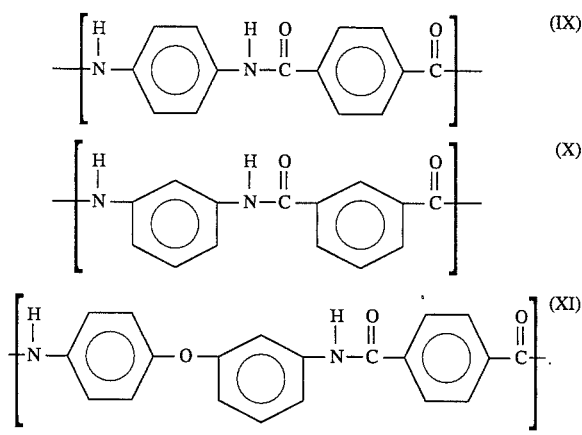

The aromatic polyamide resin is a heat resistant resin which has been marketed recently and is expected to develop in various fields by utilizing its specific properties. Representative examples of the aromatic polyamide resin include those having the above structural unit (IX), (X) and (XI), that is, the aromatic polyamide resin having one or more of the above recurring structural units in any molecule or a mixture of two or more aromatic polyamide resin having these structural units.

The aromatic polyamide resins which can be used in the invention are marketed, for example, in the name of "Kevlar" (Trade mark; E. I. Du Pont de Nemours & Co.), "Nomex" (Trade mark; E. I. Du Pont de Nemours & Co.), "Conex" (Trade mark; Teijin) and "Technole" (Trade mark; Teijin).

Other aromatic polyamide resins having various kinds of skeletons are provided according to ortho-, meta- and para-isomer structure. The resin having para-para bonding of the formula (IV) has an extremely high softening point and melting point and can be most preferably used as a heat resistant resin in the invention.

The fluororesin, graphite and the aromatic polyamide resin are added in a total amount of these additives of from 1 to 150 parts by weight for 100 parts by weight of the above resin composition comprising the polyimide resin and the thermotropic liquid crystal polymer.

When the total amount of these additives is less than 1 part by weight, the effect for improving wear resistance is small. On the other hand, a total amount exceeding 150 parts by weight is unfavorable because processability and mechanical characteristics of resulting resin composition are impaired and dimensional change of molded articles is increased in the heat treatment for post-crystallization.

Similar to the above composition B, other ingredients can be added to the composition of the invention, if desired, to prepare a composition in a similar manner.

Another composition is a polyimide-based resin composition for low friction materials (hereinafter referred to as composition D) comprising fluororesin and carbon fibers in addition to the polyimide resin represented by the above formula (II) and the thermotropic liquid polymer.

In the composition D, the proportion of the polyimide resin to the thermotropic liquid polymer is the same as above.

The fluororesin that can be used in the composition D is the same as above. Practical examples are one or more fluororesins selected from the group consisting of the above described (a) to (f).

Particularly, tetrafluoroethylene resin (PTFE) of the formula (a) is outstanding in these properties and is most preferably used in the composition D.

The fluororesin used in the polyimide-based resin composition D is usually in the form of powder and has a particle size of from 1 to 25 µm, preferably from 5 to 10 µm.

The amount of the fluororesin is in the range of from 1 to 60 parts by weight for 100 parts by weight of the polyimide resin composition comprising the polyimide resin of the above formula (I) and the thermotropic liquid crystal polymer. An amount less than 1 part by weight leads to inferior abrasion resistance of the resulting resin composition. On the other hand, an amount exceeding 60 parts by weight leads to inferior mechanical strength of the resulting resin composition.

The amount of the carbon fibers is in the range of from 5 to 100 parts by weight for 100 parts by weight of the polyimide resin composition comprising the polyimide resin of the above formula (I) and the thermotropic liquid crystal polymer. An amount less than 5 parts by weight impairs mechanical characteristics of the resulting resin composition. On the other hand, an amount exceeding 100 parts by weight leads to inferior processability of the resulting resin composition.

Similar to the above composition B, other ingredients can be added to the composition of the invention, if desired, to prepare a composition in a similar manner.

Another composition is a carbon-fiber reinforced polyimide-based resin composition (hereinafter referred to as composition E) comprising carbon fibers in addition to the polyimide resin represented by the above formula (II) and the thermotropic liquid polymer.

In the composition E, the proportion of the polyimide resin to the thermotropic liquid polymer is the same as above. The thermotropic liquid polymer is in the range of preferably from 40 to 1% by weight, more preferably from 30 to 2% by weight of the polyimide resin.

The rate of crystallization is remarkably increased by mixing the thermotropic liquid polymer which can form a nematic liquid crystal phase. As a result, the crystallization temperature can be shifted to the low temperature side in a temperature increasing step and to the high temperature side in temperature decreasing step.

The amount of the carbon fibers is in the range of from 5 to 100 parts by weight for 100 parts by weight of the polyimide resin composition comprising the polyimide resin of the above formula (I) and the thermotropic liquid crystal polymer. An amount less than 5 parts by weight impairs the mechanical characteristics of the resulting resin composition. On the other hand, an amount exceeding 100 parts by weight leads to inferior processability of the resulting resin composition.

Similar to the above composition B, other ingredients can be added to the composition of the invention, if desired, to prepare a composition in a similar manner.

Still another composition is a potassium titanate fiber reinforced polyimide-based resin composition (hereinafter referred to as composition F) comprising potassium titanate fibers in addition to the polyimide resin represented by the above formula (I) and the thermotropic liquid crystal polymer.

The potassium titanate fibers which can be used in the invention are a kind of whisker and a needle-like crystals having a fundamental, chemical composition $K_2O.6TiO_2$, $K_2O.6TiO_2.H_2O$. A representative melting point is from 1300° to 1350° C. An average fiber length is usually from 5 to 50 µm, preferably from 20 to 30 µm. An average fiber diameter is usually from 0.05 to 1.0 μm, preferably from 0.1 to 0.3 μm. The potassium titanate fiber can be usually appliance untreated. However, the fibers can also be pretreated with silane coupling agents such as aminosilane and epoxysilane or surface treating agents such as chromic chloride in order to increase compatibility with the matrix resin of the invention depending upon the object for use.

The amount of the potassium titanate fibers is in the range of from 5 to 200 parts by weight for 100 parts by weight of the above resin composition comprising the polyimide resin and the thermotropic liquid crystal polymer. Preferably, the amount of the potassium titanate fiber is in the range of from 5 to 100% by weight.

An amount of the potassium titanate fibers less than 5 parts by weight results in inferior mechanical properties of the resulting resin composition and not very good dimensional stability of the molded articles in the heat treatment. On the other hand, an amount of the fibers greater than 200 parts by weight leads to insufficient processability of the resulting resin composition.

Similar to the above composition B, other ingredients can be added to the composition E of the invention, if desired, to prepare a composition in a similar manner.

A further composition is a polyimide-based resin composition (hereinafter referred to as composition G) comprising a crystallization accelerator in addition to the polyimide resin represented by the above formula (I) and the thermotropic liquid crystal polymer.

The crystallization accelerator which is used as a required component in the composition G is an inorganic compound selected from the group consisting of calcium chloride, aluminum phosphate, hydrotalcite compounds, sodium chloride and graphite or an organic compound having the formula (XII) or (XIII).

Sodium chloride which can be used in the invention is a common product having purity of 95% or more.

Graphite is an allotropic form of carbon and is a natural product or an artificial product manufactured by heat treatment of pitch coke. Graphite is usually used as an auxiliary material of resins. Marketed graphite includes Lonza Graphite Powder (manufactured by Lonza Japan Co.) and can be used as a crystallization accelerator.

The organic crystallization accelerators which can be used for the composition of the invention include one or more imide oligomer represented by the formulas (XII) and (XIII):

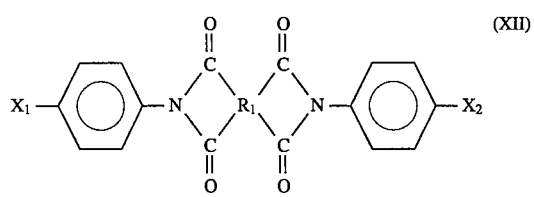

wherein $R_1$ is a tetravalent radical selected from the group consisting of an aliphatic radical and alicyclic radical having from 2 to 10 carbon atoms, respectively, and phenyl radical, and may be the same as or different from R in the formula (I); and $X_1$ and $X_2$ are one or more radicals selected from the group consisting of hydrogen, chlorine, bromine, fluorine, lower alkyl and lower alkoxy radical having from 1 to 10 carbon atoms, respectively; and

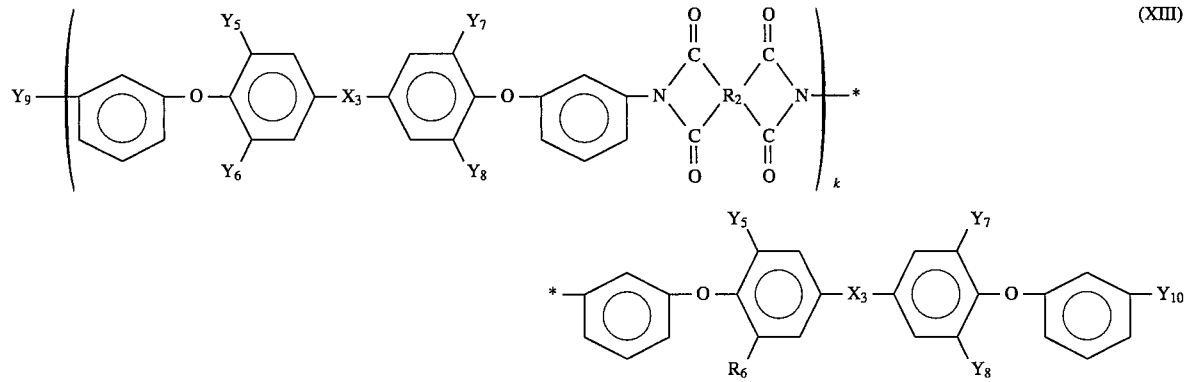

In these accelerators, calcium chloride exists in the form of anhydrous salt, mono-, di-, tetra- and hexa-hydrate, and any of these compounds can be used for the invention.

Aluminum phosphate exists in the form of orthophosphates such as an anhydrous salt having the structure $AlPO_4$ and hydrated salt having the structure $AlPO_4 \cdot 4H_2O$, $AlPO_4 \cdot 3.5H_2O$, and metaphosphates such as $Al(PO_3)_3$. Any of these phosphates can be used for the invention.

The term hydrotalcite compounds mean mineral hydrotalcite which is produced in Ural district, Russia and Snarum district, Norway and has a chemical structure $Mg_6Al_2(OH)_{16}CO_3 \cdot 4H_2O$, and a synthetic product which has a similar structure $Mg_{4.5}Al_2(OH)_{13}Co_3 \cdot 5H_2O$ or a product of Kyowa Kagaku Kogyo Co. having a structure $Mg_4 \cdot 2Al_2(OH)_{12} \cdot 4CO_3 \cdot 5H_2O$. These compounds are usually applied in the form of powder.

wherein K is an integer of from 1 to 10, $X_3$ is one or more divalent radicals selected from the group consisting of a direct bond, hydrocarbon having from 1 to 10 carbon atoms, hexafluorinated isopropylidene, carbonyl, thio and sulfonyl; $Y_5$, $Y_6$, $Y_7$ and $Y_8$ are individually one or more divalent radicals selected from the group consisting of hydrogen, chlorine, bromine, lower alkyl and lower alkoxy radical having from 1 to 10 carbon atoms, respectively; $R_2$ is a tetravalent radical selected from the group consisting of an aliphatic radical and alicylic radical having from 2 to 10 carbon atoms, respectively, and phenyl; $X_3$, $Y_5$, $Y_6$, $Y_7$, $Y_8$ and R may be individually the same as or different from the radicals having the same symbols in the formula (I); and $Y_9$ and $Y_{10}$ are —H, —$NH_2$ or

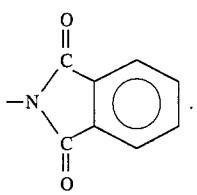

The above imide oligomers can be usually prepared by the addition of a chain stopper in the polycondensation of polyimide resin.

The imide oligomer having the formulas (XII) or (XIII) is obtained by blocking the molecular chain end with an organic mono diamine or a dicarboxylic acid anhydride such as phthalic anhydride.

A portion or the whole of these blocking agents can be replaced by other dicarboxylic acid anhydrides in the range not impairing the object of the invention.

Exemplary other dicarboxylic acid anhydrides which can be used in place of these blocking agents include 2,3-benzophenonedicarboxylic anhydride,
3,4-benzophenonedicarboxylic anhydride,
2,3-dicarboxyphenyl phenyl ether anhydride,
3,4-dicarboxyphenyl phenyl ether anhydride,
2,3-biphenyldicarboxylic anhydride,
3,4-biphenyldicarboxylic anhydride,
2,3-dicarboxyphenyl phenyl sulfone anhydride,
3,4-dicarboxyphenyl phenyl sulfone anhydride,
2,3-dicarboxyphenyl phenyl sulfide anhydride,
3,4-dicarboxyphenyl phenyl sulfide anhydride,
1,2-naphthalenedicarboxylic anhydride,
2,3-naphthalenedicarboxylic anhydride,
1,8-naphthalenedicarboxylic anhydride,
1,2-anthracenedicarboxylic anhydride,
2,3-anthracenedicarboxylic anhydride and
1,9-anthracenedicarboxylic anhydride.

The amount of the crystallization accelerator used in the invention is in the range of from 0.01 to 25 parts by weight, preferably from 0.05 to 10 parts by weight for 100 parts by weight of the resin composition comprising the polyimide resin and the thermotropic liquid crystal polymer. When the amount of the accelerator is less than 0.01 part by weight, almost no increase is observed in the rate of crystallization. On the other hand, an amount of the accelerator exceeding 25 parts by weight severely decreases the mechanical strength of the molded articles.

Similar to the above composition B, other ingredients can be added to the composition G of the invention, if desired, to prepare a composition in a similar manner.

The present invention will hereinafter be illustrated further in detail by way of examples and comparative examples.

In the examples and comparative examples, physical properties were determined by the following methods.

Inherent viscosity 0.5 g of polyimide powder was dissolved in 100 ml of a solvent mixture consisted of p-chlorophenol/phenol in a ratio of 9/1 by weight. Measurement was conducted after cooling the solution to 35° C.

Tensile strength

Measured in accordance with ASTM D-638 by using a tensile test specimen without a weld and a tensile test specimen welded at the center of the parallel portion.

Elongation at break

Measured in accordance with ASTM D-638.

Izod impact strength

Measured in accordance with ASTM D-258.

Heat distortion temperature (HDT)

Measured in accordance with ASTM D-648.

Melt Flow Ratio (MFR)

Measurements of Examples 8~12 and Comparative Examples 5~7 were conducted at 400° C., under 1.05 kg load in accordance with JIS K-7210, on the other hand MFRs of Examples 77~96 and Comparative Examples 47~52 were measured at 400° C., under 2.16 kg load in accordance with JIS K-7210.

Spiral flow length:

Measurement was conducted at a cylinder temperature of 400° C., mold temperature of 180° C., injection pressure of 1000 kg/cm$^2$ and cavity thickness of 1 mm.

Heat shrinkage

Heat treatment was carried out under the below described conditions on a tensile test specimen in accordance with ASTM D-638. Dimensional change in the longer direction of the specimen was measured before and after the heat treatment. Heat treatment carried out in three heating steps, 150° C.×20 hrs→260° C.×20 hrs→ 300° C.×2 hrs.

Warpage

Injection molded plate (75×100×2 mm) is heated and change of warpage height in longer direction was measured between before and after treatment.

Peak temperature (Tc) of crystallization exotherm

Peak temperature ($Tc_1$) of crystallization exotherm under a temperature-rise rate of 10° C./min from the room temperature and peak temperature ($Tc_2$) of crystallization exotherm under a temperature-fall rate of 10° C./min from 400° C. were measured by using a differential scanning calorimeter.

Coefficient of linear thermal expansion

Coefficient of linear thermal expansion from 25° to 200° C. was measured with a thermal expansion tester unwelded tensile specimens in the flow direction (MD) and the transverse direction (TD).

The ratio TD/MD of the linear expansion coefficient was assumed as being anisotropic Dynamic friction coefficient (1)

In the case of Examples 22~28 and Comparative Examples 18~24 measured with a thrust type friction and wear tester at a face pressure of 1.1 kg/cm$^2$, sliding velocity of 150 m/min. and operating time of 60 minutes under a lubricant-free condition for a friction material of SUJ 2. On the other hand, in the case of Examples 29–45, 36~76 and Comparative Examples 25~32, 42–46, measured with a thrust type friction and wear tester at a face pressure of 10 kg/cm$^2$, sliding velocity of 7 m/min. and operating time of 40 minutes under a lubricant-free condition for a friction material of stainless steel 45 C.

Wear coefficient (1) Measured with the thrust type friction and wear tester at a face pressure of 0.78 kg/cm$^2$, sliding velocity of 128 m/min, and operating time of about 100 hours under a lubricant-free condition for a wear material of SUJ 2, in the case of Examples 22~28 and Comparative Examples 18~24.

(2) Measured with the cylindrical type friction and wear tester at the face pressure of 5 kg/cm$^2$, sliding velocity of 90 m/min, and operating time of about 40 hours under a lubricant-free condition for a wear material of stainless steel 45 C in the case of Examples 29~ 45 and Comparative Examples 25~32.

(3) Measured with the cylindrical type friction and wear tester at the face pressure of 5 kg/cm$^2$, sliding velocity of 100 m/min, and operating time of about 60 hours under a lubricant-free condition for a wear material of SUS 304, in the case of Examples 63476 and Comparative Examples 42~46.

Softening temperature (°C.)

Measured by penetration initiating time in TMA penetration method with a thermo-mechanical analyzer TM-30 (Trade mark; Shimadzu Seisakusho Co.) at a temperature increase rate of 5° C./min and pressure of 18.6 kg/cm$^2$.

Limit of PV value

A limit of PV value of an untreated material was measured by using a thrust type wear tester at a sliding load of 40 kg/cm$^2$ under a lubricant-free condition for an friction material of SUS 304.

A specimen after heat treatment accompanied with crystallization in three heating steps, 150° C.×20 hrs→260° C.×20 hrs→300° C.×2 hrs, was also measured a limit of PV value under the same conditions as above.

Dimensional change due to heat treatment accompanied with crystallization

A plate which was injection molded under the above conditions and had dimensions of 75 mm×100 mm×1.5 mm', was heat treated and dimensional change in the flow direction (hereinafter referred to as MD) and the transverse direction (hereinafter referred to as TD) was measured before and after the heat treatment. The heat treatment was carried out in three steps; 150° C.×20 hrs→260° C.×20 hrs→300° C.×2 hrs.

Molding shrinkage

A plate which was injection molded under the above conditions and had dimensions of 50 mm×50 mm×3 mm was used as a specimen for measuring molding shrinkage. A film gate having a thickness of 1 mm was fitted on an edge having a length of 50 mm. The melt-flow direction was indicated by MD (Machine Direction) and the rectangular direction was indicated by TD (Transverse Direction).

EXAMPLES 1–4

Polyimide powder having an inherent viscosity of 0.90 dl/g and a glass transition temperature of 235° C. was prepared from bis[4( 3-aminophenoxy)phenyl] sulfide and pyromellitic dianhydride.

The above polyimide powder was dry blended with pellets of aromatic polyester, U-polymer U-100(Trade Mark of Unitika Co. Ltd.) in various compositions as illustrated in Table 1. The mixture obtained was melt kneaded at 340° to 360° C. with an extruder having a diameter of 40 mm and a screw of 3.0 in compression ratio, and extruded to cut into uniformly blended pellets.

The pellets obtained above were injection molded at a cylinder temperature of 370° C. and a mold temperature of 150° C. by using a conventional injection molding machine. Physical and thermal properties of molded specimens were measured. Results are illustrated in Table 1.

COMPARATIVE EXAMPLES 1 and 2

The same procedures as described in Examples 1–4 were carried out by using the compositions which were outside of the scope of the invention. Physical and thermal properties of the molded specimens were measured. Results are illustrated in Table 1.

EXAMPLES 5–7

Polyimide powder having an inherent viscosity of 0.50 dl/g, glass transition temperature of 257° C. and a melting point of 387° C. were prepared from 4,4'-bis(3-aminophenoxy) biphenyl and pyromellitic dianhydride.

The above polyimide powder was dry blended with an aromatic polyester XYDAR SRT-500 (Trade Mark of DARTCO Co. Ltd.) which forms an anisotropic molten phase at a temperature of 420° C. or less, in various compositions as illustrated in Table 1. The mixtures obtained were melt-kneaded at 400° to 420° C. to obtain uniform pellets by carrying out the same procedures as described in Examples 1–4.

The pellets obtained were injection molded at a cylinder temperature of 400° to 420° C. and a mold temperature of 200° C. Physical and thermal properties of the molded specimens were tested and results are illustrated in Table 1.

COMPARATIVE EXAMPLES 3 AND 4

The same procedures as described in Examples 5–7 were carried out by using the compositions which were outside of the scope of the invention. Physical and thermal properties of the molded specimens were measured. Results are illustrated in Table 1.

EXAMPLES 8–10 AND COMPARATIVE EXAMPLES 5 AND 6

Polyimide powder having an inherent viscosity of 0.45 dl/g was prepared from 4,4'-bis(3-aminophenoxy)biphenyl and pyromellitic dianhydride. The polyimide powder was dry blended with aromatic polyether ketone VICTREX PEK 220P (Trade Mark of I.C.I. Ltd.) in compositions as illustrated in Table 2. The mixtures obtained were melt-kneaded with a twin screw extruder 30 mm in diameter at a cylinder temperature of 380° to 410° C. and extruded and cut into uniform pellets.

MFR of the pellets was measured and results are illustrated in Table 2.

The pellets were injection molded to obtain specimens having dimensions of 6 mm×70 mm×3 mm. HDT was measured on these specimens and results are illustrated in Table 2.

EXAMPLE 11 AND COMPARATIVE EXAMPLES 7 AND 8

Polyimide powder having an inherent viscosity of 0.46 dl/g was prepared from bis[4-(3-aminophenoxy)phenyl sulfide and pyromellitic dianhydride. The polyimide powder obtained was dry blended with aromatic polyether ketone VICTREX PEK 220P (Trade Mark of I.C.I. Ltd.) in the compositions as illustrated in Table 2. The mixtures obtained were evaluated by the same procedures as carried out in Example 8. Results are illustrated in Table 2.

EXAMPLE 12 AND COMPARATIVE EXAMPLES 9 AND 10

Polyimide powder having an inherent viscosity of 0.45 dl/g was prepared from 2,2-bis[4-(3-aminophenoxy)phenyl] propane and 3,3',4,4'-benzophenonetetracarboxylic dianhydride.

The polyimide powder obtained was dry blended with aromatic polyether ketone VICTREX PEK 220P(Trade Mark of I.C.I. Ltd.) in compositions as illustrated in Table 2. The mixtures obtained were evaluated by the same procedures as carried out in Example 8. Results are illustrated in Table 2.

EXAMPLES 13–17 AND COMPARATIVE EXAMPLES 11 AND 12

Polyimide having an inherent viscosity of 0.45 dl/g prepared from 4,4-bis(3-aminophenoxy)biphenyl and pyromellitic dianhydride. The polyimide obtained was dry blended with a thermotropic liquidcrystal polymer Xydar SRT-50 (Trade Mark of DARTCO CO. Ltd.) in compositions as illustrated in Table 3. The mixtures thus obtained were melt-kneaded in an extruder at a cylinder temperature of 400° C. and extruded and cut into pellets.

The pellets were injection molded at a cylinder temperature of 380° to 410° C., mold temperature of 190° C. and injection pressure of 500 kg/cm$^2$ to obtain tensile test specimens. Tensile test specimens having a weld at the center of the parallel portion were also injection molded under the same conditions. Results of tensile strength test are illustrated in Table 3.

Spiral flow length was measured at a cylinder temperature of 400° C., mold temperature of 180° C., injection pressure of 1000 kg/cm$^2$ and cavity thickness of 1 mm. Results are illustrated in Table 3.

Heat shrinkage, coefficient of linear expansion and peak temperature (Tc) of crystallization exotherm were measured by using injection molded tensile specimens without a weld. Results are illustrated in Table 3. The ratio TD/MD of the coefficient of linear thermal expansion was assumed as being anisotropic and are also illustrated in Table 3.

EXAMPLE 18

The same procedures as described in Example 14 were carried out except that ECONOL E-6000 (Trade Mark of Sumitomo Chemical Co. Ltd.) was used as a thermotropic liquid-crystal polymer. Results are illustrated in Table 3.

EXAMPLE 19

The same procedures as described in Example 16 were carried out except that ECONOL E-6000 (Trade Mark of Sumitomo Chemical Co. Ltd.) was used as a thermotropic liquid-crystal polymer.

COMPARATIVE EXAMPLE 13

The same procedures as described in Comparative Example 12 were carried out except that ECONOL E-6000 (Trade Mark of Sumitomo Chemical Co. Ltd.) was used as a thermotropic liquid-crystal polymer. Results are illustrated in Table 3.

EXAMPLE 20

The same procedures as described in Example 15 were carried out except that polyimide prepared from bis[4-(3-aminophenoxy)phenyl] sulfide and pyromellitic dianhydride and having an inherent viscosity of 0.46 dl/g was used. Results are illustrated in Table 3.

COMPARATIVE EXAMPLE 14

The same procedures as described in Comparative Example 11 were carried out except that polyimide prepared from bis[4-(3-aminophenoxy)phenyl]sulfide and pyromellitic dianhydride and having an inherent viscosity of 0.46 dl/g was used. Results are illustrated in Table 3.

COMPARATIVE EXAMPLE 15

The same procedures as described in Comparative Example 12 were carried out except that polyimide prepared from bis[4-(3-aminophenoxy)phenyl]sulfide and pyromellitic dianhydride and having an inherent viscosity of 0.46 dl/g was used. Results are illustrated in Table 3.

EXAMPLE 21

The same procedures as described in Example 15 were carried out except that polyimide prepared from 2,2-bis[4-(3-aminophenoxy)phenyl]propane and 3,3',4,4'-benzophenonetetracarboxylic dianhydride and having an inherent viscosity of 0.45 dl/g was used. Results are illustrated in Table 3.

COMPARATIVE EXAMPLE 16

The same procedures as described in Comparative Example 11 were carried out except that polyimide prepared from 2,2-bis[4-(3-aminophenoxy)phenyl]propane and 3,3',4 4'-benzophenonetetracarboxylic dianhydride and having an inherent viscosity of 0.45 dl/g was used. Results are illustrated in Table 3.

COMPARATIVE EXAMPLE 17

The same procedures as described in Comparative Example 12 were carried out except that polyimide prepared from 2,2-bis[4-(3-aminophenoxy)phenyl] propane and 3,3',4,4'-benzophenonetetracarboxylic dianhydride and having an inherent viscosity of 0.45 dl/g was used. Results are illustrated in Table 3.

TABLE 1

|  | Polyimide (wt. part) | Aromatic polyester (wt. part) | Minimum injection pressure* (kg/cm$^2$) | Tensile strength (kg/cm$^2$) | Elongation at break (%) | Izod impact strength (notched) (kg · cm/cm) | Heat distortion temperature (18.6 kg/cm$^2$) (°C.) |
| --- | --- | --- | --- | --- | --- | --- | --- |
| Comp. Ex. 1 | 100 | 0 | 620 | 1650 | 60 | 21 | 215 |
| Example 1 | 95 | 5 | 540 | 1650 | 60 | 21 | 215 |
| Example 2 | 85 | 15 | 450 | 1650 | 60 | 21 | 215 |
| Example 3 | 75 | 25 | 380 | 1640 | 60 | 21 | 214 |
| Example 4 | 50 | 50 | 330 | 1570 | 60 | 21 | 210 |

TABLE 1-continued

|  | Polyimide (wt. part) | Aromatic polyester (wt. part) | Minimum injection pressure* (kg/cm$^2$) | Tensile strength (kg/cm$^2$) | Elongation at break (%) | Izod impact strength (notched) (kg · cm/cm) | Heat distortion temperature (18.6 kg/cm$^2$) (°C.) |
|---|---|---|---|---|---|---|---|
| Comp. Ex. 2 | 0 | 100 | 300 | 720 | 55 | 20 | 175 |
| Comp. Ex. 3 | 100 | 2 | 750 | 1160 | 100 | 18 | 235 |
| Example 5 | 98 | 2 | 680 | 1160 | 100 | 18 | 243 |
| Example 6 | 85 | 15 | 400 | 1150 | 97 | 18 | 276 |
| Example 7 | 50 | 50 | 130 | 1100 | 87 | 17 | 316 |
| Comp. Ex. 4 | 0 | 100 | ** | 800 | 5 | 8 | 335 |

Note; *Lower melt viscosity causes lower minimum injection pressure.

TABLE 2

|  | Composition | | MFR (g/10 min) | spiral flow length (mm) | Heat shrinkage (%) | Warpage * (%) | HDT (°C.) |
|---|---|---|---|---|---|---|---|
|  | Polyimide (wt. %) | PEK (wt. %) | | | | | |
| Example 8 | 90 | 10 | 9 | 65 | 6 | 22 | 225 |
| Example 9 | 75 | 25 | 11 | 80 | 4 | 15 | 210 |
| Example 10 | 60 | 40 | 14 | 105 | 2 | 10 | 200 |
| Comp. Ex. 5 | 100 | 0 | 7 | 50 | 12 | 88 | 238 |
| Comp. Ex. 6 | 40 | 60 | 18 | 140 | 2 | 4 | 175 |
| Example 11 | 75 | 25 | 10 | 70 | 4 | 20 | 208 |
| Comp. Ex. 7 | 100 | 0 | 5 | 30 | 14 | 96 | 232 |
| Comp. Ex. 8 | 40 | 60 | 16 | 120 | 3 | 6 | 170 |
| Example 12 | 75 | 25 | 10 | 65 | 4 | 18 | 210 |
| Comp. Ex. 9 | 100 | 0 | 7 | 45 | 13 | 90 | 234 |
| Comp. Ex. 9 | 40 | 60 | 19 | 140 | 2 | 5 | 171 |

Note; *Injection molded plate (75 × 100 × 2 mm) is heat treated and change of warpage height in longer direction was measured between before and after treatment.

TABLE 3

|  | Composition | | MFR (g/10 min) | Spiral flow length (mm) | Tc (°C.) | | Coefficient of linear thermal expansion (1/°C.) | | Anisotropy TD/MD | Tensile strength (kg/cm$^2$) | |
|---|---|---|---|---|---|---|---|---|---|---|---|
|  | Polyimide (wt. %) | PEK (wt. %) | | | Tc$_1$ | Tc$_2$ | TD | MD | | Unwelded | Welded |
| Example 13 | Xydar | 2 | 70 | 8 | 307 | 330 | 6.0 × 10$^{-5}$ | 5.6 × 10$^{-5}$ | 1.1 | 940 | 920 |
| Example 14 | " | 5 | 85 | 5 | 305 | 334 | 6.0 × 10$^{-5}$ | 5.0 × 10$^{-5}$ | 1.2 | 940 | 900 |
| Example 15 | " | 15 | 100 | 3 | 305 | 334 | 6.0 × 10$^{-5}$ | 4.0 × 10$^{-5}$ | 1.5 | 950 | 980 |
| Example 16 | " | 30 | 125 | 2 | 302 | 335 | 5.9 × 10$^{-5}$ | 3.0 × 10$^{-5}$ | 2.0 | 960 | 300 |
| Example 17 | " | 45 | 160 | 2 | 300 | 333 | 6.1 × 10$^{-5}$ | 2.5 × 10$^{-5}$ | 2.4 | 980 | 720 |
| Comp. Ex. 11 | — | — | 50 | 12 | 324 | 322 | 6.0 × 10$^{-5}$ | 6.0 × 10$^{-5}$ | 1.0 | 940 | 920 |
| Comp. Ex. 12 | Xydar | 60 | 190 | 1 | 299 | 333 | 6.6 × 10$^{-5}$ | 1.8 × 10$^{-5}$ | 3.7 | 960 | 580 |

TABLE 3-continued

| | Composition | | MFR | Spiral flow length | Tc (°C.) | | Coefficient of linear thermal expansion (1/°C.) | | Anisotropy | Tensile strength (kg/cm²) | |
|---|---|---|---|---|---|---|---|---|---|---|---|
| | Polyimide (wt. %) | PEK (wt. %) | (g/10 min) | (mm) | Tc₁ | Tc₂ | TD | MD | TD/MD | Unwelded | Welded |
| Example 18 | ECONOL | 5 | 90 | 6 | 306 | 331 | $6.0 \times 10^{-5}$ | $5.0 \times 10^{-5}$ | 1.2 | 930 | 870 |
| Example 19 | " | 30 | 135 | 4 | 302 | 332 | $6.1 \times 10^{-5}$ | $3.2 \times 10^{-5}$ | 1.9 | 940 | 720 |
| Comp. Ex. 13 | " | 60 | 200 | 1 | 300 | 333 | $7.0 \times 10^{-5}$ | $2.0 \times 10^{-5}$ | 3.5 | 950 | 510 |
| Example 20 | Xydar | 15 | 85 | 3 | 307 | 331 | $6.0 \times 10^{-5}$ | $4.1 \times 10^{-5}$ | 1.5 | 920 | 840 |
| Comp. Ex. 14 | — | — | 40 | 14 | 327 | 325 | $5.9 \times 10^{-5}$ | $5.9 \times 10^{-5}$ | 1.0 | 920 | 910 |
| Comp. Ex. 15 | — | 60 | 170 | 1 | 300 | 334 | $6.5 \times 10^{-5}$ | $1.8 \times 10^{-5}$ | 3.6 | 940 | 520 |
| Example 21 | Xydar | 15 | 90 | 3 | 306 | 330 | $6.0 \times 10^{-5}$ | $4.0 \times 10^{-5}$ | 1.5 | 900 | 830 |
| Comp. Ex. 16 | — | — | 45 | 12 | 325 | 323 | $6.0 \times 10^{-5}$ | $5.6 \times 10^{-5}$ | 1.0 | 910 | 900 |
| Comp. Ex. 17 | " | 60 | 180 | 1 | 300 | 331 | $6.0 \times 10^{-5}$ | $1.9 \times 10^{-5}$ | 3.6 | 930 | 500 |

EXAMPLES 22–27

Polyimide which was prepared from 4,4'-bis(3-aminophenoxy) biphenyl and pyromellitic dianhydride and had an inherent viscosity of 0.45 dl/g was dry blended with various ingredients in proportions illustrated in Table 1 and extruded through a twin-screw extruder at 370° to 400° C. to form pellets. The pellets were injection molded at a cylinder temperature of 370° to 400° C., injection pressure of 800 kg/cm² and a mold temperature of 180° to form specimens for measuring friction and wear characteristics, flexural strength, flexural modulus and softening temperature.

The inherent viscosity was measured at 35° C. by dissolving 0.5 g of polyimide powder in 100 ml of a solvent mixture of p-chlorophenol/phenol in a ratio of 90/10. Results obtained are illustrated in Table 4.

EXAMPLE 28

The same procedures as described in Example 23 were carried out except that polyimide which was prepared from bis[4-(3-aminophenoxy) phenyl] sulfide and pyromellitic anhydride and had an inherent viscosity of 0.46 dl/g was used. Results are illustrated in Table 4.

COMPARATIVE EXAMPLE 18–24

Specimens were prepared by carrying out the same procedures as described in Example 22 except that the raw materials were blended in proportions illustrated in Table 5. Properties of the specimens were measured, and results are illustrated in Table 5.

In Comparative Examples 18, 19 and 22, solid lubricant was added alone and phenolic resin was not added.

In Comparative Examples 20 and 21, solid lubricant and phenolic resin were added. However, the amounts of both additives were outside the scope of the invention.

In Comparative Example 23, phenolic resin was added alone in the absence of solid lubricant. Comparative Example 24 contains aromatic polyimide resin alone in the absence of phenolic resin and solid lubricant.

As seen in Table 4 and Table 5, any of Examples 22 to 28 illustrates stable and low friction coefficient and wear coefficient. In Comparative Examples 18–24, either one or both of the coefficients have a very large value and clearly illustrate very inferior sliding property.

TABLE 4

| Example | 22 | 23 | 24 | 25 | 26 | 27 | 28 |
|---|---|---|---|---|---|---|---|
| Formulation | | | | | | | |
| Polyimide resin liquid crystal polymer | 95 | 95 | 95 | 70 | 70 | 70 | 95 |
| Xydar | 5 | 5 | 5 | 30 | 30 | 30 | — |
| ECONOL | — | — | — | — | — | — | 5 |
| Bellpearl R-900 | — | — | 20 | — | — | — | — |
| Bellpearl C-2000 | 40 | 10 | — | 30 | 30 | 30 | 10 |
| PTFE | 10 | 10 | 2 | 10 | — | — | 10 |
| Graphite | — | — | — | — | 10 | — | — |
| Lead monoxide | — | — | — | — | — | 10 | — |
| Physical properties | | | | | | | |
| Dynamic friction coefficient | 0.22 | 0.24 | 0.22 | 0.20 | 0.23 | 0.24 | 0.23 |
| Wear coefficient ($10^{-10}$ cm³/kg · m) | 80 | 35 | 50 | 35 | 60 | 40 | 40 |
| Flexural strength (kg/mm²) | 13.8 | 13.5 | 14.3 | 14.0 | 12.1 | 11.8 | 13.2 |
| Flexural modulus (kg/mm²) | 370 | 340 | 390 | 370 | 440 | 290 | 340 |
| Softening temperature (°C.) | 240 | 238 | 241 | 239 | 240 | 234 | 238 |

TABLE 5

| Comparative Example | 18 | 19 | 20 | 21 | 22 | 23 | 24 |
|---|---|---|---|---|---|---|---|
| Formulation | | | | | | | |
| Polyimide resin liquid crystal polymer | 95 | 95 | 95 | 95 | 95 | 95 | 95 |
| Xydar | 5 | 5 | 5 | 5 | 5 | 5 | 5 |
| ECONOL | — | — | — | — | — | — | — |
| Bellpearl C-2000 | — | — | 1 | 55 | — | 5 | — |
| PTFE | 5 | 10 | 30 | 0.5 | 30 | — | — |
| Graphite | 20 | — | — | — | — | — | — |
| Lead monoxide | — | 10 | — | — | — | — | — |
| Physical properties | | | | | | | |
| Dynamic friction coefficient | 0.19 | 0.34 | 0.22 | 0.31 | 0.22 | 0.33 | 0.34 |
| Wear coefficient ($10^{-10}$ cm³/kg · m) | 5100 | 75 | 7700 | 630 | 8500 | 1600 | 1900 |
| Flexural strength (kg/mm²) | 12.0 | 11.5 | 9.0 | 9.8 | 8.8 | 11.6 | 12.7 |
| Flexural modulus (kg/mm²) | 530 | 300 | 210 | 480 | 200 | 320 | 320 |

TABLE 5-continued

| Comparative Example | 18 | 19 | 20 | 21 | 22 | 23 | 24 |
|---|---|---|---|---|---|---|---|
| Softening temperature (°C.) | 238 | 233 | 230 | 237 | 229 | 235 | 229 |

In Table 4 and Table 5, thermotropic liquid crystals cured phenolic resin and solid lubricant which were used in Examples and Comparative Examples are as follows. Amounts in the formulation are parts by weight.

① Thermotropic liquid crystal polymer:

Xydar SRT-500 (Trade mark; Nippon Oil Co.)

ECONOL E-6000 (Trade mark; Sumitomo Chemical Co.)

② Phenolic resin

Bellpearl R-900 and C-2000 (Trade mark; Kanebo Co.)

Bellpearl R-900 has an average particle size of 48 μm and solubility of 5% by weight or less in methanol. Bellpearl C-2000 has an average particle size of 22 μm and solubility of 0.1% by weight or less in methanol. Lower solubility in methanol leads to better resistance to alcohol.

③ PTFE

KS-15 (Trade mark; Lonza Co.)

④ Graphite

ACP (Trade mark; Japan Graphite Co.)

⑤ Lead monoxide

Litharge S (Trade mark; Shinagawa Kako Co.)

EXAMPLES 29–38

Polyimide which was prepared from 4,4'-bis(3-aminophenoxy) biphenyl and pyromellitic dianhydride and had an inherent viscosity of 0.46 dl/g was dry blended with various ingredients in proportions illustrated in Table 6 and extruded through a twin-screw extruder at 370° to 400° C. to form pellets. The pellets were injection molded at a cylinder temperature of 370° to 410° C., injection pressure of 900 kg/cm² and a mold temperature of 180° C. to form specimens measuring friction coefficient, flexural strength, dimensional change due to heat treatment accompanied with crystallization and threshold PV value. Results are illustrated in Table 6.

COMPARATIVE EXAMPLE 25–28

Specimens were prepared by repeating the procedures of Example 29 except that the raw materials were blended in proportions illustrated in Table 7. Properties of the specimens were measured, and results are illustrated in Table 7.

EXAMPLES 39–45

Polyimide which was prepared from 4,4'-bis(3-aminophenoxy) biphenyl and pyromellitic dianhydride and had an inherent viscosity of 0.46 dl/g was dry blended with various ingredients in proportions illustrated in Table 8 and extruded through a twin-screw extruder at 370° to 400° C. to form pellets. The pellets were injection molded at a cylinder temperature of 370° to 410° C., injection pressure of 900 kg/cm² and a mold temperature of 180° C. to form specimens for measuring friction coefficient, wear coefficient, dimensional change due to heat treatment accompanied with crystallization and threshold PV value. Results are illustrated in Table 8.

COMPARATIVE EXAMPLE 29–32

Specimens were prepared by repeating the procedures of Example 39 except that the raw materials were blended in proportions illustrated in Table 9. Properties of the specimens were measured, and results are illustrated in Table 9.

As seen by comparing Table 6 and Table 8 with Table 7 and Table 9, any of Examples 29–45 have a stable and low friction coefficient and good dimensional stability after treatment, and can improve threshold PV value. On the other hand, Comparative Examples 25–33 are definitely very poor in either one of those properties or have a disadvantage of very large decrease in mechanical strength.

TABLE 6

| Example | 29 | 30 | 31 | 32 | 33 | 34 | 35 |
|---|---|---|---|---|---|---|---|
| Formulation (wt %) | | | | | | | |
| Polyimide resin | 95 | 95 | 95 | 90 | 90 | 80 | 80 |
| Liquid crystal polymer | | | | | | | |
| ECONOL | 5 | 5 | — | 10 | 10 | — | 20 |
| Xydar | — | — | 5 | — | — | 20 | — |
| Vectra | — | — | — | — | — | — | — |
| PTFE | 5 | 10 | 10 | 10 | 10 | 5 | 10 |
| Graphite | — | 15 | 30 | 15 | 30 | 0 | 30 |
| Aromatic polyamide resin | — | — | — | — | — | — | — |
| Physical properties | | | | | | | |
| Dynamic friction coefficient | 0.15 | 0.12 | 0.11 | 0.11 | 0.10 | 0.14 | 0.10 |
| Dimensional stability | | | | | | | |
| TD (%) | −1.1 | −1.0 | −1.0 | −0.1 | −0.1 | −0.2 | −0.1 |
| MD (%) | −1.0 | −0.9 | −0.9 | −0.2 | −0.2 | −0.2 | −0.2 |
| Limit of PV value | | | | | | | |
| untreated | 1200 | 1400 | 1400 | 1400 | 1400 | 1200 | 1400 |
| heat treated (kg/cm² · m/min) | 1400 | 1600 | 1600 | 1600 | 1600 | 1400 | 1600 |
| Flexural strength (kg/mm²) | 12.4 | 12.1 | 11.7 | 13.1 | 12.8 | 13.6 | 12.9 |

| Example | 36 | 37 | 38 |
|---|---|---|---|
| Formulation (wt %) | | | |
| Polyimide resin | 50 | 90 | 90 |
| Liquid crystal polymer | | | |
| ECONOL | — | — | — |
| Xydar | 50 | 10 | — |
| Vectra | — | — | 10 |
| PTFE | — | 17 | 31 |
| Graphite | 5 | 45 | 15 |
| Aromatic polyamide resin | — | — | — |
| Physical properties | | | |
| Dynamic friction coefficient | 0.20 | 0.10 | 0.10 |
| Dimensional stability | | | |
| TD (%) | −0.2 | −0.2 | −0.2 |
| MD (%) | −0.2 | −0.3 | −0.3 |
| Limit of PV value | | | |
| untreated | 1200 | 1400 | 1400 |
| heat treated (kg/cm² · m/min) | 1400 | 1400 | 1600 |
| Flexural strength | 13.7 | 11.7 | 11.0 |

TABLE 6-continued (kg/mm²)

TABLE 7

| Comparative Example | 25 | 26 | 27 | 28 |
|---|---|---|---|---|
| Formulation (wt %) | | | | |
| Polyimide resin | 95 | 90 | 100 | 100 |
| Liquid crystal polymer | | | | |
| ECONOL | 5 | 10 | — | — |
| Xydar | — | — | — | — |
| Vectra | — | — | — | — |
| PTFE | — | 60 | 11 | 21 |
| Graphite | — | 60 | 21 | — |
| Aromatic polyamide resin | — | — | — | — |
| Physical properties | | | | |
| Dynamic friction coefficient | 0.38 | 0.10 | 0.14 | 0.15 |
| Dimensional stability | | | | |
| TD (%) | −1.1 | −0.4 | −29.4 | −29.6 |
| MD (%) | −1.0 | −0.5 | −31.6 | −32.1 |
| Limit of PV value | | | | |
| untreated | 1200 | 1200 | 1200 | 1400 |
| | | | (a) | (a) |
| heat treated (kg/cm² · m/min) | 1200 | 1400 | — | — |
| Flexural strength (kg/mm²) | 12.7 | 8.5 | 7.8 | 7.8 |

Note: (a) Heat treatment caused severe warpage Measurement was impossible.

TABLE 8

| Example | 39 | 40 | 41 | 42 | 43 | 44 | 45 |
|---|---|---|---|---|---|---|---|
| Formulation (wt %) | | | | | | | |
| Polyimide resin | 90 | 90 | 90 | 75 | 75 | 75 | 70 |
| Liquid crystal polymer | | | | | | | |
| ECONOL | 10 | 10 | — | 25 | — | — | 30 |
| Xydar | — | — | 10 | — | 25 | — | — |
| Vectra | — | — | — | — | — | 25 | — |
| PTFE | 5 | 10 | 30 | 5 | 10 | 50 | 30 |
| Graphite | — | — | — | — | — | — | 30 |
| Aromatic polyamide resin | 5 | 10 | 30 | 10 | 20 | 50 | 30 |
| Physical properties | | | | | | | |
| Dynamic friction coefficient | 0.25 | 0.25 | 0.18 | 0.26 | 0.28 | 0.14 | 0.20 |
| Dimensional stability | | | | | | | |
| TD (%) | −0.1 | −0.1 | −0.2 | −0.1 | −0.1 | −0.2 | −0.1 |
| MD (%) | −0.2 | −0.2 | −0.3 | −0.2 | −0.2 | −0.3 | −0.2 |
| Limit of PV value | | | | | | | |
| untreated | 1200 | 1400 | 2200 | 1200 | 2000 | 2200 | 2400 |
| heat treated (kg/cm² · m/min) | 1400 | 1600 | 2600 | 1400 | 2400 | 2600 | 2600 |
| Wear coefficient (× 10⁻⁸ cm³ min/kgmHr) | 360 | 170 | 60 | 340 | 200 | 110 | 10 |

TABLE 9

| Comparative Example | 29 | 30 | 31 | 32 |
|---|---|---|---|---|
| Formulation (wt %) | | | | |
| Polyimide resin | 85 | 98 | 98 | 100 |
| Liquid crystal polymer | | | | |
| ECONOL | 15 | 2 | — | — |
| Xydar | — | — | 2 | — |
| Vectra | — | — | — | — |
| PTFE | — | 80 | 55 | — |
| Graphite | — | — | 55 | — |
| Aromatic polyamide resin | — | 80 | 70 | 10 |
| Physical properties | | | | |
| Dynamic friction coefficient | 0.35 | (b) | (b) | 0.30 |
| Dimensional stability | | | | |
| TD (%) | −0.1 | | | −28.8 |
| MD (%) | −0.2 | | | −30.1 |
| Limit of PV value | | | | |
| untreated | 1200 | | | 600 (a) |
| heat treated (kg/cm² · m/min) | 1200 | | | — |
| Wear coefficient (× 10⁻⁸ cm³ min/kgmHr) | 1400 | | | 1110 |

Note: (a) Heat treatment caused severe warpage and measurement was impossible
(b) Processing was impossible.

In Tables 6–9, thermotropic liquid crystals, fluororesin, graphite and aromatic polyamide resin which were used in Examples and Comparative Examples are as follows.

(1) Thermotropic liquid crystal polymer

Xydar SRT-500 (Trade mark; Nippon Oil Co.)

ECONOL E-6000 (Trade mark; Sumitomo Chemical Co.)

Vectra A-950 (Trade mark; Polyplastics Co.)

(2) Fluororesin

PTFE L-5 (Trade mark; Dankin Co.)

(3) Graphite:

ACP (Trade mark; Japan Graphite Co.) (4) Aromatic polyamide resin

KEVLAR 49 (Trade mark; E.I.Du Pont de Nemours &. Co.)

EXAMPLES 46~54

Polyimide which was prepared from 4,4'-bis(3-aminophenoxy) biphenyl and pyromellitic dianhydride and had an inherent viscosity of 0.46 dl/g was dry blended with various ingredients in proportions illustrated in Table 10 and extruded through a twin-screw extruder at 370° to 400 T to form pellets. The pellets were injection molded at a cylinder temperature of 370° to 410° C., injection pressure of 900 kg/cm² and a mold temperature of 180° C. to form specimens. Tensile strength, tensile modulus and flexural modulus were measured by those specimens. The pellets were injection molded at a cylinder temperature of 420° C., injection pressure of 1500 kg/cm² and mold temperature of 180° C. to measure spiral flow length having a flow thickness of 1 mm. Results are illustrated in Table 10.

COMPARATIVE EXAMPLE 33~36

Specimens were prepared by repeating the procedures of Example 46 except that the raw materials were blended in proportions illustrated in Table 11. Properties of the specimens were measured, and results are illustrated in Table 11.

As clearly understood by comparing Table 10 and Table 11, any of Examples 46–54 have excellent mechanical properties and processability. On the other hand, Comparative Examples 33–36 have disadvantage that either mechanical properties or processability are inferior.

TABLE 10

| Example | 46 | 47 | 48 | 49 | 50 | 51 |
|---|---|---|---|---|---|---|
| Formulation (wt %) | | | | | | |
| Polyimide resin | 98 | 96 | 94 | 90 | 87 | 85 |
| Liquid crystal polymer | | | | | | |
| ECONOL | — | 4 | — | — | 13 | — |
| Xydar | 2 | — | — | 10 | — | 15 |
| Vectra | — | — | 6 | — | — | — |
| Carbon fiber | 45 | 45 | 45 | 45 | 45 | 55 |
| Glass fiber | 6 | — | — | — | — | — |
| Physical properties | | | | | | |
| Tensile strength (kg/mm$^2$) | 25.0 | 25.5 | 25.0 | 25.0 | 24.8 | 25.4 |
| Tensile modulus (10$^3$ kg/mm$^2$) | 2.1 | 2.1 | 2.3 | 2.4 | 2.5 | 2.5 |
| Flexural modulus (10$^3$ kg/mm$^2$) | 2.1 | 2.1 | 2.2 | 2.3 | 2.3 | 2.3 |
| Spiral flow length (mm) | 40 | 42 | 45 | 59 | 70 | 50 |

| Example | 52 | 53 | 54 |
|---|---|---|---|
| Formulation (wt %) | | | |
| Polyimide resin | 80 | 70 | 60 |
| Liquid crystal polymer | | | |
| ECONOL | 20 | — | — |
| Xydar | — | 30 | 40 |
| Vectra | — | — | — |
| Carbon fiber | 55 | 60 | 65 |
| Glass fiber | — | 5 | — |
| Physical properties | | | |
| Tensile strength (kg/mm$^2$) | 25.2 | 25.3 | 25.1 |
| Tensile modulus (10$^3$ kg/mm$^2$) | 2.5 | 2.5 | 2.5 |
| Flexural modulus (10$^3$ kg/mm$^2$) | 2.3 | 2.3 | 2.3 |
| Spiral flow length (mm) | 55 | 50 | 56 |

TABLE 11

| Comparative Example | 33 | 34 | 35 | 36 |
|---|---|---|---|---|
| Formulation (wt %) | | | | |
| Polyimide resin | 100 | 100 | 100 | 100 |
| Liquid crystal polymer | | | | |
| ECONOL | — | — | — | — |
| Xydar | — | — | 20 | — |
| Vectra | — | — | — | 15 |
| Carbon fiber | — | 45 | — | 110 |
| Glass fiber | — | — | — | — |
| Physical properties | | | | |
| Tensile strength (kg/mm$^2$) | 9.4 | 23.3 | 9.9 | (a) |
| Tensile modulus (10$^3$ kg/mm$^2$) | 0.3 | 1.9 | 0.4 | |
| Flexural modulus (10$^3$ kg/mm$^2$) | 0.3 | 1.9 | 0.4 | |
| Spiral flow length (mm) | 80 | 35 | 250 | |

Note; (a) Processing was impossible.

The following thermotropic liquid crystal polymers and carbon fiber were used in Table 11 and Table 12.

(1) Thermotropic liquid crystal polymer:
Xydar SRT-500 (Trade mark; Nippon Oil Co.)
ECONOL E-6000 (Trade mark; Sumitomo Chemical Co.)
Vectra A-950 (Trade mark; Polyplastics Co.)
(2) Carbon fiber
Carbon fiber HTA (Trade mark; Toho Rayon Co.)

EXAMPLES 55~61

Polyimide which was prepared from 4,4'-bis(3-aminophenoxy) biphenyl and pyromellitic dianhydride and had an inherent viscosity of 0.46 dl/g was dry blended with various ingredients in proportions illustrated in Table 12 and extruded through a twin-screw extruder at 370° to 400° C. to form pellets. The pellets were injection molded at a cylinder temperature of 370° to 410° C., injection pressure of 900 kg/cm$^2$ and a mold temperature of 180° C. to form specimens.

Molding shrinkage, tensile strength, flexural strength and heat distortion temperature were measured by these specimens. Results are illustrated in Table 12.

EXAMPLE 62

Polyimide which was prepared from 4,4'-bis(3-aminophenoxy) biphenyl and pyromellitic dianhydride and had an inherent viscosity of 0.46 dl/g was dry blended with various ingredients in proportions illustrated in Table 12 and extruded through a twin-screw extruder at 370° to 400° C. to form pellets. The pellets were injection molded at a cylinder temperature of 420° C., injection pressure of 1500 kg/cm$^2$ and a mold temperature of 180° C. to measure spiral flow length having a thickness of 1 mm.

EXAMPLES 37~40

Specimens were prepared by repeating the procedures of Example 55 except that the raw materials were blended in proportions illustrated in Table 13. Properties of the specimens were measured, and results are illustrated in Table 13.

COMPARATIVE EXAMPLE 41

Various raw materials were blended with formulations illustrated in Table 14 and spiral flow length was measured by carrying out the same procedures as described in Example 62. Results are illustrated in Table 14.

As seen in Table 12 and Table 13, any of Examples 55~61 exhibit excellent mechanical properties and molding shrinkage. On the other hand, Comparative Examples 37~40 have disadvantage that either mechanical properties or molding shrinkage is distinctly inferior.

As seen in Table 14, Example 62 has excellent processability. On the other hand, Comparative Example 41 is short in the spiral flow length and hence is inferior in processability.

TABLE 12

| Example | 55 | 56 | 57 | 58 | 59 | 60 | 61 |
|---|---|---|---|---|---|---|---|
| Formulation | | | | | | | |
| (wt %) | | | | | | | |
| Polyimide resin Liquid crystal polymer | 90 | 90 | 90 | 90 | 80 | 80 | 80 |
| ECONOL | 10 | 10 | — | — | 20 | — | — |
| Xydar | — | — | 10 | 10 | — | — | 20 |
| Vectra | — | — | — | — | — | 20 | — |
| Potassium titanate fiber | 10 | 30 | 50 | 70 | 80 | 100 | 150 |
| Physical properties | | | | | | | |
| Molding shrinkage | | | | | | | |
| MD (%) | 0.4 | 0.2 | 0.2 | 0.2 | 0.2 | 0.1 | 0.1 |
| TD (%) | 0.5 | 0.3 | 0.3 | 0.2 | 0.2 | 0.1 | 0.1 |
| Tensile strength (kg/mm$^2$) | 12.2 | 13.9 | 14.7 | 16.3 | 16.9 | 18.0 | 19.6 |
| Flexural strength (kg/mm$^2$) | 16.3 | 18.0 | 20.0 | 22.1 | 22.9 | 24.9 | 25.9 |
| Heat distortion temperature (°C.) | 235 | 240 | 243 | 246 | 247 | 250 | 251 |

TABLE 13

| Comparative Example | 37 | 38 | 39 | 40 |
|---|---|---|---|---|
| Formulation | | | | |
| (wt %) | | | | |
| Polyimide resin Liquid crystal polymer | 100 | 95 | 70 | 90 |
| ECONOL | — | 5 | — | — |
| Xydar | — | — | 30 | 10 |
| Vectra | — | — | — | — |
| Potassium titanate fiber | — | — | — | 220 |
| Physical properties | | | | |
| Molding shrinkage | | | | |
| MD (%) | 0.8 | 0.6 | 0.4 | (a) |
| TD (%) | 0.8 | 0.7 | 0.7 | |
| Tensile strength (kg/mm$^2$) | 9.4 | 10.0 | 9.8 | |
| Flexural strength (kg/mm$^2$) | 14.0 | 14.9 | 14.8 | |
| Heat distortion temperature (°C.) | 235 | 235 | 235 | |

Note; (a) Processing was impossible

TABLE 14

| | Example 62 | Comparative Example 41 |
|---|---|---|
| Formulation | | |
| (wt %) | | |
| Polyimide resin Liquid crystal polymer | 70 | 100 |
| ECONOL | 30 | — |

TABLE 14-continued

| | Example 62 | Comparative Example 41 |
|---|---|---|
| Xydar | — | — |
| Vectra | — | — |
| Potassium titanate fiber | 80 | 80 |
| Spiral flow length (mm) | 55 | 7 |

In Tables 12~14, the following thermotropic liquid crystal polymers and potassium titanate fiber were used.

(1) Thermotropic liquid crystal polymer

Xydar SRT-500 (Trade mark; Nippon Oil Co.)

ECONOL E-6000 (Trade mark; Sumitomo Chemical Co.)

Vectra A-950 (Trade mark; Polyplastics Co.)

(2) Potassium titanate fiber

Potassium titanate whisker TISMO-D (Trade mark; Ohtsuka Chemical Co.)

EXAMPLES 63~76

Polyimide which was prepared from 4,4'-bis(3-aminophenoxy) biphenyl and pyromellitic dianhydride and had an inherent viscosity of 0.46 dl/g was dry blended with various ingredients in proportions illustrated in Table 12 and extruded through a twin-screw extruder at 370° to 400° C. to form pellets. The pellets were injection molded at a cylinder temperature of 370° to 410° C. , injection pressure of 900 kg/cm$^2$ and a mold temperature of 180° C. to form specimens.

Friction coefficient, wear coefficient, tensile strength and flexural strength were measured. Results are illustrated in Table 15 and Table 16.

COMPARATIVE EXAMPLE 42~46

Specimens were prepared by repeating the procedures of Example 63 except that the raw materials were blended in proportions illustrated in Table 17. Properties of the specimens were measured, and results are illustrated in Table 17.

TABLE 15

| Example | 63 | 64 | 65 | 66 | 67 | 68 | 69 |
|---|---|---|---|---|---|---|---|
| Formulation | | | | | | | |
| (wt %) | | | | | | | |
| Polyimide resin Liquid crystal polymer | 90 | 90 | 90 | 90 | 90 | 90 | 90 |
| ECONOL | 10 | 10 | 10 | — | — | — | — |
| Xydar | — | — | — | 10 | 10 | 10 | — |
| Vectra | — | — | — | — | — | — | 10 |
| PTFE | 30 | 40 | 10 | 10 | 20 | 20 | 50 |
| Carbon fiber | 60 | 65 | 40 | 50 | 55 | 40 | 70 |
| Physical properties | | | | | | | |
| Dynamic friction coefficient | 0.14 | 0.14 | 0.16 | 0.16 | 0.16 | 0.16 | 0.13 |
| Wear coefficient (× 10$^{-8}$ cm$^3$ min/kgmhr) | 180 | 180 | 200 | 190 | 180 | 200 | 170 |
| Tensile strength (kg/mm$^2$) | 24.0 | 23.7 | 20.9 | 24.8 | 24.5 | 20.4 | 23.1 |
| Flexural strength (kg/mm$^2$) | 19.0 | 18.5 | 16.5 | 20.1 | 19.4 | 16.2 | 17.8 |

TABLE 16

| Example | 70 | 71 | 72 | 73 | 74 | 75 | 76 |
|---|---|---|---|---|---|---|---|
| Formulation (wt %) | | | | | | | |
| Polyimide resin | 75 | 75 | 70 | 70 | 70 | 70 | 70 |
| Liquid crystal polymer | | | | | | | |
| ECONOL | 25 | — | 30 | 30 | — | — | — |
| Xydar | — | 25 | — | — | 30 | 30 | — |
| Vectra | — | — | — | — | — | — | 30 |
| PTFE | 15 | 20 | 30 | 40 | 10 | 20 | 50 |
| Carbon fiber | 40 | 40 | 60 | 65 | 50 | 55 | 70 |
| Physical properties | | | | | | | |
| Dynamic friction coefficient | 0.16 | 0.16 | 0.14 | 0.14 | 0.15 | 0.15 | 0.13 |
| Wear coefficient ($\times 10^{-8}$ cm$^3$ min/kgmhr) | 180 | 180 | 170 | 170 | 180 | 180 | 170 |
| Tensile strength (kg/mm$^2$) | 19.1 | 18.9 | 23.0 | 22.2 | 24.0 | 23.3 | 21.9 |
| Flexural strength (kg/mm$^2$) | 15.8 | 15.6 | 18.1 | 17.9 | 19.6 | 18.8 | 16.9 |

TABLE 17

| Comparative Example | 42 | 43 | 44 | 45 | 46 |
|---|---|---|---|---|---|
| Formulation (wt %) | | | | | |
| Polyimide resin | 100 | 95 | 80 | 90 | 70 |
| Liquid crystal polymer | | | | | |
| ECONOL | — | — | — | — | 30 |
| Xydar | — | 5 | 20 | — | — |
| Vectra | — | — | — | 10 | — |
| PTFE | — | — | 85 | 10 | 70 |
| Carbon fiber | — | — | 40 | 200 | 170 |
| Physical properties | | | | | |
| Dynamic friction coefficient | 0.41 | 0.38 | 0.13 | (a) | 0.13 |
| Wear coefficient ($\times 10^{-8}$ cm$^3$ min/kgmhr) | 1700 | 1400 | 110 | | 90 |
| Tensile strength (kg/mm$^2$) | 9.4 | 9.9 | 7.1 | | 8.1 |
| Flexural strength (kg/mm$^2$) | 13.1 | 12.7 | 10.2 | | 10.9 |

Note; (a); Processing was impossible

In Tables 15~17, following thermotropic liquid crystal polymer, fluororesin and carbon fiber were used.

(1) Thermotropic liquid crystal polymer

Xydar SRT-500 (Trade mark; Nippon Oil Co.)

ECONOL E-6000 (Trade mark; Sumitomo Chemical Co.)

Vectra A-950 (Trade mark; Polyplastics Co.)

(2) Fluororesin

PTFE 1-5 (Trade mark; Dankin Co.)

(3) Carbon fiber

Carbon fiber HTA (Trade mark; Toho Rayon Co.)

As seen in Tables 15~17, any of Examples 63~76 exhibit excellent sliding property and mechanical properties. On the other hand, Comparative Examples 42~46 are very poor in either one of these properties or have distinctly inferior processability.

Preparation Example of Polyimide

To a reaction vessel equipped with a stirrer, reflux condenser and a nitrogen inlet tube, 21.8 kg (100 mole) of pyromellitic dianhydride and 38.3 kg of N,N'-dimethylacetamide was charged. To the solution, 35.7 kg (97 mole) of 4,4'-bis(3-aminophenoxy)biphenyl was added by portions with caution to prevent temperature rise of the solution and stirred for 20 hours at the room temperature.

Successively 2.0 kg (20 mole) of triethylamine and 25.5 kg (25 mole) of acetic anhydride were added dropwise. After an hour from finishing dropwise addition, yellow polyimide powder started to precipitate. Stirring was continued for further 10 hours at room temperature. Resulting slurry was filtered, washed with methanol and dried at 180° C. for 2 hours to obtain 51.1 kg of polyimide powder having an inherent viscosity of 0.62 dl/g. The inherent viscosity was measured at 35° C. in a solution containing 0.5 g of polyimide in 100° C. of a solvent mixture of p-chlorophenol/phenol in a weight ratio of 90/10.

EXAMPLES 77~80

Polyimide resin powder which was prepared from 4,4'-bis(3-aminophenoxy)biphenyl and pyromellitic dianhydride and had an inherent viscosity of 0.45 dl/g was dry-blended with crystallization accelerator CaCl$_2$ in formulations illustrated in Table 18 and pelletized by an extruder having a bore diameter of 40 mm at a cylinder temperature of 360° to 410° C.

The crystallization velocity of the resulting pellet was examined with a Parkin-Elmer differential scanning calorimeter (hereinafter referred to as DSC). About 10 mg of the sample was completely melted by heating at 400° C. for 5 minutes and successively cooled at a rate of 16° C./min to measure crystallization temperature and calorific value at the crystallization.

EXAMPLES 81~84

The same procedures as described in Examples 77~80 were carried out except that aluminum phosphate was used as a crystallization accelerator. Results are illustrated in Table 18.

EXAMPLES 85~88

The procedures of Examples 77~80 were repeated except that hydrotalcite compounds were used as a crystallization accelerator. Results are illustrated in Table 18.

EXAMPLES 89–99

The same procedures as described in Examples 77–80 were carried out except that NaI was used as a crystallization accelerator. Results are illustrated in Table 18.

COMPARATIVE EXAMPLES 47~52

The same procedures as described in Examples 77~80 were carried out on the systems without crystallization accelerators and the systems having 30 parts by weight of various crystallization accelerators. Results are illustrated in Table 18.

In DSC analysis, a higher exothermic peak generally means a faster rate of crystallization. The system without a crystallization accelerator has a slow rate of crystallization and thus generates almost no exothermic heat. On the other hand, the systems containing various crystallization accelerators have increased exothermic heat which indicates enhanced rate of crystallization.

However, when the amount of the crystallization accelerator is 30 parts by weight, melt flowability is severely decreased and leads to problems such as impaired processability.

EXAMPLES 97–100

Polyimide resin powder which was prepared from 4,4'-bis(3-aminophenoxy)biphenyl and pyromellitic dianhydride and had an inherent viscosity of 0.45 dl/g was dry-blended with a compound-I having the formula:

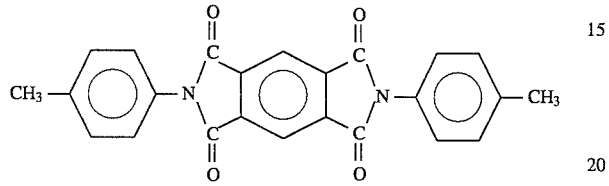

as a crystallization accelerator in formulations illustrated in Table 19 and pelletized by an extruder having a bore diameter of 10 mm at a cylinder temperature of 360° to 410° C.

The crystallization velocity of the resulting pellets was examined with a Parkin-Elmer differential scanning calorimeter (hereinafter referred to as DSC). About 10 mg of the sample was completely melted by heating at 400° C. for 5 minutes and successively cooled at a rate of 16° C./min to measure crystallization temperature and calorific value at the crystallization.

The pellet obtained above was injection molded at a cylinder temperature of 370° to 420° C. to form tensile test specimens. The mechanical properties of the specimens were measured in accordance with ASTM D-638 and results are illustrated in Table 19.

EXAMPLES 101–104

The same procedures as described in Examples 97–100 were carried out except that an imide oligomer-I having the formula:

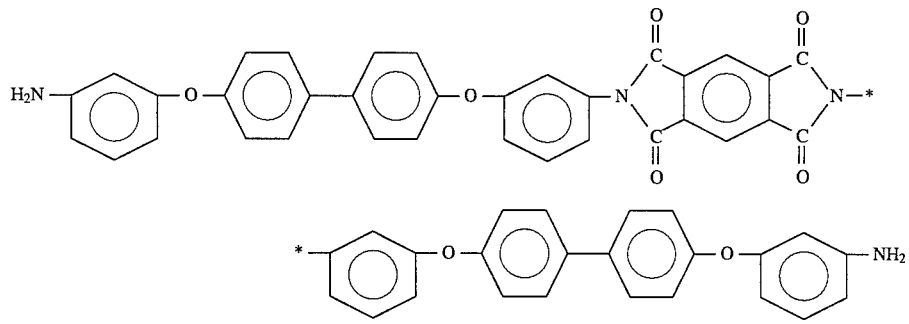

was used as a crystallization accelerator. Results are illustrated in Table 19.

EXAMPLES 105–108

The same procedures as described in Examples 97–100 were carried out except that an imide oligomer-II having the formula:

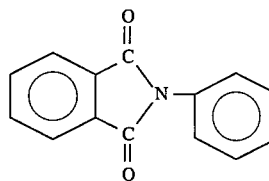
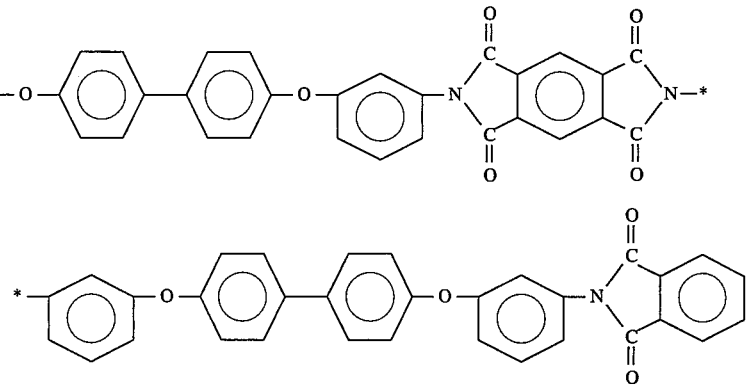

was used as a crystallization accelerator. Results are illustrated in Table 19.

COMPARATIVE EXAMPLES 53–56

The same procedures as described in Examples 97–100 were carried out on the systems without crystallization accelerators and the systems having 30 parts by weight of various crystallization accelerators. Results are illustrated in Table 19.

In DSC analysis, a higher exothermic peak generally means faster rate of crystallization. The system without a crystallization accelerator has a slow rate of crystallization and thus generates almost no exothermic heat. On the other hand, the systems containing various crystallization accelerators have much increased exothermic heat which indicates enhanced rate of crystallization.

However, when the amount of the crystallization accelerator is 30 parts by weight, melt flowability is severely decreased and leads to problems such as a great decrease in mechanical strength.

EXAMPLES 109–113

Polyimide resin powder which was prepared from 4,4'-bis(3-aminophenoxy)biphenyl and pyromellitic dianhydride and had an inherent viscosity of 0.45 dl/g was dry blended with an aromatic polyester, Xydar SRT-500 (Trade mark; DARTCO Co.) which formed an anisotropic molten phase at a temperature of 420° C. or less and $CaCl_2$ as a crystallization accelerator in formulations illustrated in Table 20. The formulations were pelletized with an extruder having a bore diameter of 40 mm at a cylinder temperature of 360° to 410° C.

The pellet obtained was injection molded at a cylinder temperature of 380° to 420° C., mold temperature of 190 T and injection pressure of 500 kg/cm$^2$ to obtain tensile test specimens. Further, tensile test specimens having a weld at the center of the parallel portion were injection molded by the same procedures as above. Tensile strength of these specimens were measured and results are illustrated in Table 20. A spiral flow length with a melt-flow thickness of 1 mm was measured by injection molding the pellet at a cylinder temperature of 400° C., mold temperature of 180° C. and injection pressure of 1000 kg/cm$^2$. Results are illustrated in Table 20.

EXAMPLES 114–115

The same procedures as conducted in Examples 109–113 were carried out except that ECONOL E-6000 which was manufactured by Sumitomo Chemical Co. was used as a thermotropic liquid crystal polymer. Results are illustrated in Table 20.

EXAMPLES 116–117

The same procedures as described in Examples 109–113 were carried out except that Vectra A-950 which was manufactured by Polyplastics Co. was used as a thermotropic liquid crystal polymer. Results are illustrated in Table 20.

COMPARATIVE EXAMPLE 57–59

The procedures carried out in Examples 109–113 were repeated except that the amount of each thermotropic liquid crystal polymer was changed as illustrated in Table 20. Results are illustrated in Table 20.

A seen in the results of spiral flow length illustrated in Table 20, flowability is much improved by using 1 part by weight or more of the thermotropic liquid crystal polymer. However, in the case of 50 parts by weight or more of the thermotropic liquid crystal polymer weld strength is seriously decreased.

EXAMPLES 118–121

Polyimide resin powder which was prepared from 4,4'-bis(3-aminophenoxy)biphenyl and pyromellitic dianhydride and had an inherent viscosity of 0.45 dl/g was dry-blended with aromatic polyester, Xydar SRT-500 (Trade mark; DARTCO Co.) which formed an anisotropic molten phase at a temperature of 420° C. or less and $CaCl_2$ as a crystallization accelerator in formulations illustrated in Table 19 and pelletized by an extruder having a bore diameter of 40 mm at a cylinder temperature of 360° to 410° C.

The crystallization velocity of the resulting pellet was examined with a Parkin-Elmer differential scanning calorimeter (hereinafter referred to as DSC). About 10 mg of the sample was completely melted by heating at 400° C. for 5 minutes and successively cooled at a rate of 16° C./min to measure crystallization temperature and calorific value at the crystallization.

The pellet obtained above was injection molded at a cylinder temperature of 380°–420° C., mold temperature of 190° C. and injection pressure of 500 kg/cm$^2$ to form tensile test specimens. Results on the mechanical strength measurement are illustrated in Table 21.

EXAMPLES 122–125

The same procedures as described in Examples 118–121 were carried out except that aluminum phosphate was used as a crystallization accelerator. Results are illustrated in Table 21.

EXAMPLES 126~129

The procedures of Examples 118~121 were repeated except that hydrotalcite compounds were used as a crystallization accelerator. Results are illustrated in Table 21.

EXAMPLES 130~133

The same procedures as described in Examples 118~121 were carried out except that NaCl was used as a crystallization accelerator. Results are illustrated in Table 21.

EXAMPLES 134~137

The procedures of Examples 118~121 were repeated except that graphite was used as a crystallization accelerator. Results are illustrated in Table 21.

COMPARATIVE EXAMPLE 60~65

The same procedures as described in Examples 118~121 were carried out on the systems without crystallization accelerators and the systems having 30 parts by weight of various crystallization accelerators. Results are illustrated in Table 21.

In DSC analysis, a higher exothermic peak generally means a faster rate of crystallization. The system without a crystallization accelerator has a slow rate of crystallization and thus generates almost no exothermic heat. On the other hand, the systems containing various crystallization accelerators have much increased exothermic heat which indicates enhanced rate of crystallization.

However, when the amount of the crystallization accelerator is 30 parts by weight, melt flowability is severely decreased and leads to problems such as a great decrease in mechanical strength.

EXAMPLES 138~142

Polyimide resin powder which was prepared from 4,4'-bis(3-aminophenoxy)biphenyl and pyromellitic dianhydride and had an inherent viscosity of 0.45 dl/g dry blended with an aromatic polyester, Xydar SRT-500 (Trade mark; DARTCO Co.) which formed an anisotropic molten phase at a temperature of 420° C. or less and Compound-I which was used in Examples 97~100, as a crystallization accelerater in formulations illustrated in Table 22. The formulations were pelletized with an extruder having a bore diameter of 40 mm at a cylinder temperature of 360° to 410° C.

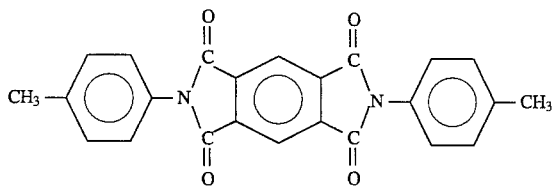

The pellet obtained was injection molded at a cylinder temperature of 380° to 420° C., mold temperature of 190° C. and injection pressure of 500 kg/cm² to obtain tensile test specimens. Further, tensile test specimens having a weld at the center of the parallel portion were injection molded by the same procedures as above. Tensile strength of these specimens were measured and results are illustrated in Table 22. A spiral flow length with a melt-flow thickness of 1 mm was measured by injection molding the pellet at a cylinder temperature of 400° C., mold temperature of 180° C. and injection pressure of 1000 kg/cm². Results are illustrated in Table 22.

EXAMPLES 143~144

The same procedures as conducted in Examples 138~142 were carried out except that ECONOL E-6000 which was manufactured by Sumitomo Chemical Co. was used as a thermotropic liquid crystal polymer. Results are illustrated in Table 22.

EXAMPLES 145~146

The same procedures as described in Examples 1384142 were carried out except that Vectra A-950 which was manufactured by Polyplastic Co. was used as a thermotropic liquid crystal polymer. Results are illustrated in Table 22.

COMPARATIVE EXAMPLE 66~68

The procedures carried out in Examples 138~142 were repeated except that the amount of each thermotropic liquid crystal polymer was changed as illustrated in Table 22. Results are illustrated in Table 22.

As seen in the results of spiral flow length illustrated in Table 22, flowability is much improved by using 1 part by weight or more of the thermotropic liquid crystal polymer. However, 50 parts by weight or more of the thermotropic liquid crystal polymer seriously lowers weld strength.

EXAMPLES 147~150

Polyimide resin powder which was prepared from 4,4'-bis(3-ammophenoxy)biphenyl and pyromellitic dianhydride and had an inherent viscosity of 0.45 dl/g was dry-blended with aromatic polyester, Xydar SRT-500 (Trade mark; DARTCO Co.) which formed an anisotropic molten phase at a temperature of 420° C. or less and Compound-I which was used in Examples 97–100 as a crystallization accelerator, in formulations illustrated in Table 23 and pelletized by an extruder having a bore diameter of 40 mm at a cylinder temperature of 360° to 410° C.

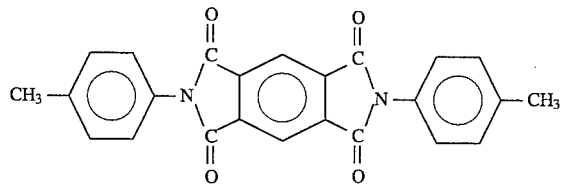

The crystallization velocity of the resulting pellet was examined with a Parkin-Elmer DSC. About 10 mg of the sample was completely melted by heating at 400° C. for 5 minutes and successively cooled at a rate of 16° C./min to measure crystallization temperature and calorific value at the crystallization. Results are illustrated in Table 23.

The pellet obtained above was injection molded at a cylinder temperature of 380°–420° C., mold temperature of 190° C. and injection pressure of 500 kg/cm² to form tensile test specimens. Results on the mechanical strength measurement are illustrated in Table 23.

EXAMPLES 151~157

The same procedures as conducted in Example 147~150 were carried out except that the imide oligomer-I used in Examples 101~104 was used as a crystallization accelerator. Results are illustrated in Table 23.

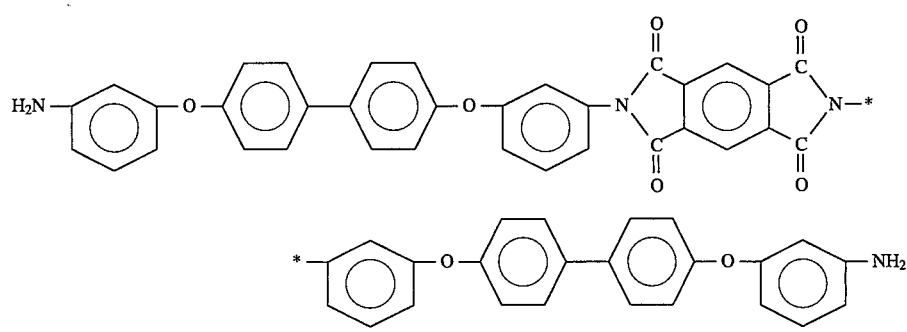

EXAMPLES 155~158

The same procedures as conducted in Example 147~150 were carried out except that the imide oligomer-II used in Examples 105~108 was used as a crystallization accelerator. Results are illustrated in Table 23.

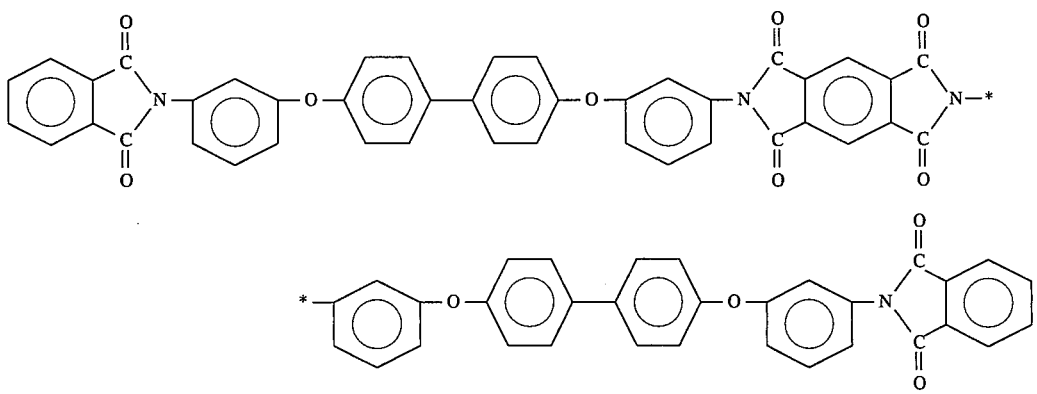

COMPARATIVE EXAMPLE 69~72

The same procedures as described in Examples 147~150 were carried out on the systems without crystallization accelerators and the systems having 30 parts by weight of various crystallization accelerators. Results are illustrated in Table 23.

In DSC analysis, a higher exothermic peak generally means a faster rate of crystallization. The system without a crystallization accelerator has a slow rate of crystallization and thus leads to almost no heat generation. On the other hand, the systems containing various crystallization accelerators have much increased heat generation which indicates enhanced rate of crystallization.

However, when the amount of the crystallization accelerator is 30 parts by weight, melt flowability is severely decreased and leads to problems such as a great decrease in mechanical strength.

TABLE 18

|  | Crystalization accelerator | | DSC | | MI |
|---|---|---|---|---|---|
|  | Compound | Amount (wt part) | Crystallization temperature (°C.) | Heat generation (cal/g) | (g/10 min) |
| Comp. Ex. 47 | — | — | 295 | 0.7 | 24.0 |
| Example 77 | CaCl$_2$ | 0.5 | 296 | 2.4 | 24.0 |
| Example 78 | " | 1 | 298 | 4.0 | 22.1 |
| Example 79 | " | 5 | 298 | 3.8 | 18.3 |
| Example 80 | " | 15 | 300 | 4.5 | 16.5 |
| Comp. Ex. 48 | " | 30 | 302 | 4.7 | 11.2 |
| Example 81 | AlPO$_4$ | 0.5 | 295 | 1.5 | 24.0 |
| Example 82 | " | 1 | 296 | 1.8 | 23.0 |
| Example 83 | " | 5 | 297 | 2.3 | 18.1 |
| Example 84 | " | 15 | 298 | 2.7 | 15.8 |
| Comp. Ex. 49 | " | 30 | 298 | 2.9 | 12.4 |
| Example 85 | hydrotalcite | 0.5 | 298 | 3.1 | 24.0 |
| Example 86 | hydrotalcite | 1 | 300 | 4.1 | 22.0 |
| Example 87 | hydrotalcite | 5 | 307 | 4.5 | 17.1 |
| Example 88 | hydrotalcite | 15 | 312 | 4.8 | 14.3 |
| Comp. Ex. 50 | hydrotalcite | 30 | 315 | 4.8 | 8.7 |
| Example 89 | NaCl | 0.5 | 296 | 2.1 | 24.0 |
| Example 90 | " | 1 | 301 | 3.1 | 21.0 |

TABLE 18-continued

| | Crystalization accelerator | | DSC | | MI |
|---|---|---|---|---|---|
| | Compound | Amount (wt part) | Crystalli- zation tempera- ture (°C.) | Heat generat- ion (cal/g) | (g/10 min) |
| Example 91 | " | 5 | 303 | 3.2 | 16.3 |
| Example 92 | " | 15 | 305 | 3.5 | 13.8 |
| Comp. Ex. 51 | " | 30 | 305 | 3.6 | 5.1 |
| Example 93 | graphite | 0.5 | 295 | 1.3 | 24.0 |
| Example 94 | " | 1 | 297 | 1.6 | 21.3 |
| Example 95 | " | 5 | 299 | 2.1 | 17.0 |
| Example 96 | " | 15 | 302 | 2.4 | 12.1 |
| Comp. Ex. 52 | " | 30 | 304 | 2.7 | 7.2 |

Note
$CaCl_2$: Kanto Kagaku Co.
$AlPO_4$: Junsei Kagaku Co.
hydrotalcite: DHT-4$A_2$, Kagawa Kagaku Kogyo Co.
NaCl: Junsei Kagaku Co.
graphite: Lonza Japan Co.

TABLE 19

| | Crystalization accelerater | | DSC | | |
|---|---|---|---|---|---|
| | Compound | Amount (wt part) | Crystalli- zation tempera- ture (°C.) | Heat generat- ion (cal/g) | Tensile strength (kg/cm²) |
| Comp. Ex. 53 | — | — | 295 | 0.7 | 940 |
| Example 97 | Compound-I | 0.5 | 297 | 6.4 | 940 |
| Example 98 | " | 1 | 298 | 7.3 | 940 |
| Example 99 | " | 5 | 301 | 9.2 | 920 |
| Example 100 | " | 15 | 305 | 9.3 | 840 |
| Comp. Ex. 54 | " | 30 | 310 | 9.3 | 630 |
| Example 101 | Oligomer-I | 0.5 | 296 | 2.1 | 940 |
| Example 102 | " | 1 | 297 | 2.6 | 940 |
| Example 103 | " | 5 | 298 | 8.0 | 920 |
| Example 104 | " | 15 | 300 | 9.1 | 810 |
| Comp. Ex. 55 | " | 30 | 304 | 9.3 | 620 |
| Example 105 | Oligomer-II | 0.5 | 296 | 1.2 | 940 |
| Example 106 | " | 1 | 298 | 1.7 | 940 |
| Example 107 | " | 5 | 299 | 4.8 | 910 |
| Example 108 | " | 15 | 302 | 7.2 | 810 |
| Comp. Ex. 56 | " | 30 | 307 | 8.4 | 640 |

TABLE 20

| | Liquid crystal polymer | | Crystallization accelerater | |
|---|---|---|---|---|
| | Compound | Amount (wt part) | Compound | Amount (wt part) |
| Example 109 | Xydar | 2 | $CaCl_2$ | 5 |
| Example 110 | " | 5 | " | 5 |
| Example 111 | " | 15 | " | 5 |
| Example 112 | " | 30 | " | 5 |
| Example 113 | " | 45 | " | 5 |
| Comp. Ex. 57 | " | 60 | " | 5 |
| Example 114 | ECONOL | 5 | " | 5 |
| Example 115 | " | 30 | " | 5 |
| Comp. Ex. 58 | " | 60 | " | 5 |
| Example 116 | Vectra | 5 | " | 5 |
| Example 117 | " | 30 | " | 5 |
| Comp. Ex. 59 | " | 60 | " | 5 |

TABLE 20-continued

| | Spiral flow length (mm) | Tensile strength | |
|---|---|---|---|
| | | Unwelded (kg/cm²) | Welded (kg/cm²) |
| Example 109 | 65 | 930 | 910 |
| Example 110 | 80 | 930 | 890 |
| Example 111 | 95 | 940 | 870 |
| Example 112 | 120 | 950 | 790 |
| Example 113 | 155 | 970 | 710 |
| Comp. Ex. 57 | 180 | 950 | 570 |
| Example 114 | 85 | 920 | 860 |
| Example 115 | 130 | 930 | 710 |
| Comp. Ex. 58 | 200 | 940 | 500 |
| Example 116 | 75 | 910 | 890 |
| Example 117 | 140 | 900 | 700 |
| Comp. Ex. 59 | 220 | 900 | 550 |

Note
$CaCl_2$: Kanto Kagaku Co.

TABLE 21

| | Liquid crystal polymer | | Crystallization accelerater | |
|---|---|---|---|---|
| | Compound | Amount (wt part) | Compound | Amount (wt part) |
| Comp. Ex. 60 | Xydar | 30 | — | — |
| Example 118 | " | " | $CaCl_2$ | 0.5 |
| Example 119 | " | " | " | 1 |
| Example 120 | " | " | " | 5 |
| Example 121 | " | " | " | 15 |
| Comp. Ex. 61 | " | " | " | 30 |
| Example 122 | " | " | $AlPO_4$ | 0.5 |
| Example 123 | " | " | " | 1 |
| Example 124 | " | " | " | 5 |
| Example 125 | " | " | " | 15 |
| Comp. Ex. 62 | " | " | " | 30 |
| Example 126 | " | " | hydrotalcite | 0.5 |
| Example 127 | " | " | " | 1 |
| Example 128 | " | " | " | 5 |

TABLE 21-continued

| | | | | |
|---|---|---|---|---|
| Example 129 | " | " | " | 15 |
| Comp. Ex. 63 | " | " | " | 30 |
| Example 130 | " | " | NaCl | 0.5 |
| Example 131 | " | " | " | 1 |
| Example 132 | " | " | " | 5 |
| Example 133 | " | " | " | 15 |
| Comp. Ex. 64 | " | " | " | 30 |
| Example 134 | " | " | graphite | 0.5 |
| Example 135 | " | " | " | 1 |
| Example 136 | " | " | " | 5 |
| Example 137 | " | " | " | 15 |
| Comp. Ex. 65 | " | " | " | 30 |

| | DSC | | |
|---|---|---|---|
| | Crystallization temperature (°C.) | Heat generation (cal/g) | Tensile strength (kg/cm$^2$) |
| Comp. Ex. 60 | 315 | 1.1 | 960 |
| Example 118 | 316 | 2.9 | 960 |
| Example 119 | 318 | 4.5 | 960 |
| Example 120 | 318 | 4.4 | 950 |
| Example 121 | 320 | 4.9 | 860 |
| Comp. Ex. 61 | 322 | 5.3 | 640 |
| Example 122 | 315 | 2.0 | 960 |
| Example 123 | 316 | 2.3 | 960 |
| Example 124 | 317 | 2.8 | 940 |
| Example 125 | 318 | 3.2 | 790 |
| Comp. Ex. 62 | 318 | 3.1 | 620 |
| Example 126 | 318 | 3.6 | 960 |
| Example 127 | 320 | 4.6 | 960 |
| Example 128 | 327 | 5.0 | 910 |
| Example 129 | 330 | 5.3 | 820 |
| Comp. Ex. 63 | 335 | 5.3 | 620 |
| Example 130 | 311 | 2.6 | 960 |
| Example 131 | 321 | 3.6 | 960 |
| Example 132 | 323 | 3.7 | 960 |
| Example 133 | 325 | 4.0 | 810 |
| Comp. Ex. 64 | 325 | 4.1 | 560 |
| Example 134 | 315 | 1.8 | 960 |
| Example 135 | 317 | 4.1 | 960 |
| Example 136 | 319 | 2.6 | 940 |
| Example 137 | 322 | 2.9 | 890 |
| Comp. Ex. 65 | 324 | 3.2 | 730 |

Note
CaCl$_2$: Kanto Kagaku Co.
AlPO$_4$: Junsei Kagaku Co.
hydrotalcite: DHT-4A2, Kyowa Kagaku Kogyo Co.
NaCl: Junsei Kagaku Co.
graphite: Lonza Japan Co.

TABLE 22

| | Liquid crystal polymer | | Crystallization accelerater | |
|---|---|---|---|---|
| | Compound | Amount (wt part) | Compound | Amount (wt part) |
| Example 138 | Xydar | 2 | Compound-I | 5 |
| Example 139 | " | 5 | " | " |
| Example 140 | " | 15 | " | " |
| Example 141 | " | 30 | " | " |
| Example 142 | " | 45 | " | " |
| Comp. Ex. 66 | " | 60 | " | " |
| Example 143 | ECONOL | 5 | " | " |
| Example 144 | " | 30 | " | " |
| Comp. Ex. 67 | " | 60 | " | " |
| Example 145 | Vectra | 5 | " | " |
| Example 146 | " | 30 | " | " |
| Comp. Ex. 68 | " | 60 | " | " |

TABLE 22-continued

| | Spiral flow length (mm) | Tensile strength | |
|---|---|---|---|
| | | Unwelded (kg/cm$^2$) | Welded (kg/cm$^2$) |
| Example 109 | 85 | 920 | 900 |
| Example 110 | 100 | 920 | 870 |
| Example 111 | 115 | 930 | 840 |
| Example 112 | 140 | 940 | 750 |
| Example 113 | 175 | 950 | 700 |
| Comp. Ex. 57 | 200 | 940 | 520 |
| Example 114 | 100 | 910 | 840 |
| Example 115 | 150 | 920 | 690 |
| Comp. Ex. 58 | 220 | 930 | 500 |
| Example 116 | 90 | 900 | 870 |
| Example 117 | 160 | 890 | 690 |
| Comp. Ex. 59 | 240 | 890 | 520 |

TABLE 23

| | Liquid crystal polymer | | Crystallization accelerater | |
|---|---|---|---|---|
| | Compound | Amount (wt part) | Compound | Amount (wt part) |
| Comp. Ex. 69 | Xydar | 30 | — | — |
| Example 147 | " | 30 | Compound-I | 0.5 |
| Example 148 | " | 30 | " | 1 |
| Example 149 | " | 30 | " | 5 |
| Example 150 | " | 30 | " | 15 |
| Comp. Ex. 70 | " | 30 | " | 30 |
| Example 151 | " | 30 | Oligoner-I | 0.5 |
| Example 152 | " | 30 | " | 1 |
| Example 153 | " | 30 | " | 5 |
| Example 154 | " | 30 | " | 15 |
| Comp. Ex. 71 | " | 30 | " | 30 |
| Example 155 | " | 30 | Oligomer-II | 0.5 |
| Example 156 | " | 30 | " | 1 |
| Example 157 | " | 30 | " | 5 |
| Example 158 | " | 30 | " | 15 |
| Comp. Ex. 72 | " | 30 | " | 30 |

| | DSC | | |
|---|---|---|---|
| | Crystallization temperature (°C.) | Heat generation (cal/g) | Tensile strength (kg/cm$^2$) |
| Comp. Ex. 69 | 315 | 1.1 | 950 |
| Example 147 | 317 | 6.8 | 950 |
| Example 148 | 318 | 7.7 | 950 |
| Example 149 | 321 | 9.6 | 940 |
| Example 150 | 325 | 9.7 | 840 |
| Comp. Ex. 70 | 330 | 9.7 | 620 |
| Example 151 | 316 | 2.6 | 950 |
| Example 152 | 317 | 3.1 | 940 |
| Example 153 | 318 | 8.5 | 920 |
| Example 154 | 320 | 9.4 | 800 |
| Comp. Ex. 71 | 324 | 9.6 | 620 |
| Example 155 | 316 | 1.7 | 950 |
| Example 156 | 318 | 2.1 | 940 |
| Example 157 | 319 | 5.0 | 920 |
| Example 158 | 322 | 7.7 | 820 |
| Comp. Ex. 72 | 327 | 8.9 | 640 |

What is claimed is:

1. A polyimide-based resin composition for sliding materials comprising from 1 to 60 parts by weight of fluororesin and from 5 to 160 parts by weight of carbon fiber for 100 parts by weight of a resin composition comprising from 50 to 99% by weight of a polyimide resin having recurring units represented by the formula (I):

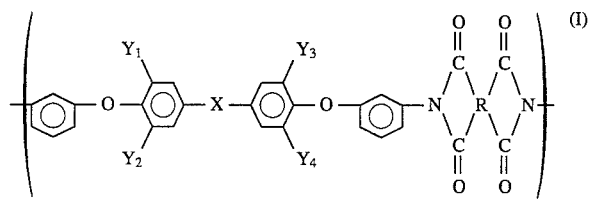

wherein X is a radical selected from the group consisting of a direct bond, sulfur, divalent hydrocarbon having from 1 to 10 carbon atoms, hexafluorinated isopropylidene, carbonyl, thio, sulfonyl and ether; $Y_1$, $Y_2$, $Y_3$ and $Y_4$ are individually a radical selected from the group consisting of hydrogen, lower alkyl, lower alkoxy, chlorine and bromine; and R is a tetravalent radical selected from the group consisting of an aliphatic radical having from 4 to 9 carbon atoms, monocyclicaliphatic radical having from 4 to 10 carbon atoms, monoaromatic radical, condensed polyaromatic radical and noncondensed aromatic radical connected to each other with a direct bond or bridge member, and from 50 to 1% by weight of one or more thermotropic liquid crystal polymer.

2. A polyimide-based resin composition for sliding materials of claim 1 wherein the thermotropic liquid crystal polymer is one or more polymer consisting of a fundamental structure having recurring units selected from the group consisting of the formulas (V), (VI), (VII) and/or (VIII):

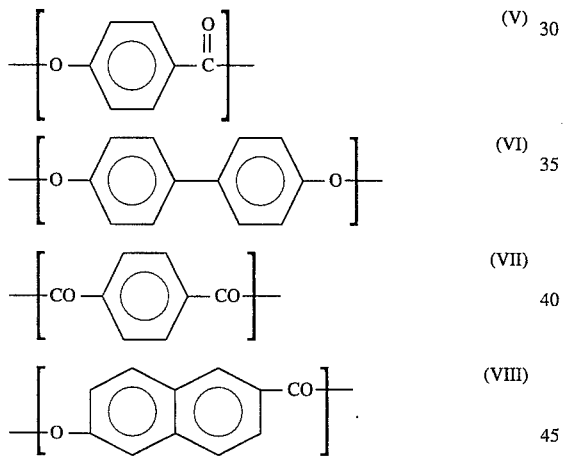

3. A polyimide based resin composition for sliding materials of claim 1 wherein the fluororesin is one ore more resin selected from the group consisting of the following (a) to (f):

(a) tetrafluoroethylene resin having in the molecule recurring structural units represented by the formula:

$$—(CF_2CF_2)—$$

(b) tetrafluoroethylene-hexafluoropropylene copolymer resin having in the molecule recurring structural units represented by the formulas:

$$—(CF_2CF_2)—$$

and $$—[CF(CF_3)CF_2]—$$

(c) tetrafluoroethylene-perfluoroalkylvinyl ether copolymer resin having in the molecule recurring structural units represented by the formulas:

$$—(CF_2CF_2)—$$

and $$—[CF(OC_mF_{2m+1})CF_2]—$$

wherein m is an integer , (d) tetrafluoroethylene-ethylene copolymer resin having in the molecule recurring structural units represented by the formula:

$$—(CF_2CF_2)—$$

and $$—(CH_2CH_2)—$$

(e) trifluorochloroethylene-ethylene copolymer resin having in the molecule recurring structural units represented by the formula:

$$—(CH_2CH_2)—$$

and $$—(CFClCF_2)—$$

(f) fluorovinylidene resin having in the molecule recurring structural units represented by the formula:

$$—(CF_2CH_2)—.$$

* * * * *